(12) United States Patent
Tomofuji et al.

(10) Patent No.: US 6,903,324 B2
(45) Date of Patent: Jun. 7, 2005

(54) OPTICAL AMPLIFIER AMPLIFYING WAVELENGTH MULTIPLEXED LIGHT, AND WAVELENGTH MULTIPLEXED LIGHT COMMUNICATIONS SYSTEM

(75) Inventors: Hiroaki Tomofuji, Kawasaki (JP); Takuji Maeda, Kawasaki (JP); Norifumi Shukunami, Sapporo (JP); Tatsuya Tsuzuki, Sapporo (JP); Yuichi Suzuki, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/102,690

(22) Filed: Mar. 22, 2002

(65) Prior Publication Data

US 2003/0106990 A1 Jun. 12, 2003

(30) Foreign Application Priority Data

Dec. 7, 2001 (JP) ........................................ 2001-373541

(51) Int. Cl.[7] ................................................ H01A 3/00
(52) U.S. Cl. ........................... 250/214 LA; 359/341.42; 359/337
(58) Field of Search ...................... 250/214 LA, 214 A; 359/333, 337, 341.42, 341.41, 341.4

(56) References Cited

U.S. PATENT DOCUMENTS

| | | | |
|---|---|---|---|
| 5,198,571 A | 3/1993 | Brayer et al. .................. 560/70 |
| 6,025,947 A | * 2/2000 | Sugaya et al. ................. 398/97 |
| 6,198,572 B1 | 3/2001 | Sugaya et al. .............. 359/337 |
| 6,509,986 B1 | * 1/2003 | Mizrahi ........................ 398/83 |
| 2001/0017729 A1 | 8/2001 | Sugaya et al. .......... 359/341.41 |

FOREIGN PATENT DOCUMENTS

| | | | |
|---|---|---|---|
| EP | 1 085 683 A1 | 3/2001 | |
| EP | 1 094 624 A2 | 4/2001 | ........... H04B/10/17 |
| JP | 11-112434 | 4/1999 | |
| JP | 2000-151515 | 5/2000 | |
| JP | 2000-232433 | 8/2000 | |

OTHER PUBLICATIONS

European Search Report.
Partial European Search Report dated Jan. 8, 2004.
D.A. Francis, et al., "A Single–Chip Linear Optical Amplifier", 2001.
J.-K. Rhee, et al., "A Novel 240–Gbps Channel–By–Channel Dedicated Optical Protection Ring Network Using Wavelength Selective Switches", 2001.

* cited by examiner

*Primary Examiner*—Thanh X. Luu
*Assistant Examiner*—Stephen Yam
(74) *Attorney, Agent, or Firm*—Staas & Halsey LLP

(57) ABSTRACT

Wavelength multiplexed light is amplified by first and second EDFs. Gains of the first and the second EDFs are respectively held to be predetermined values by first and second AGC circuits. Between the first and the second EDFs, a variable attenuator is arranged. A loss in the variable attenuator is controlled by an ALC circuit so that output power is held to be a predetermined value instructed by a supervisory control signal. Respective time constants of the first and the second AGC circuits are sufficiently short in comparison with the response times of the first and the second EDFs. The time constant of the ALC circuit is sufficiently long in comparison with the time period required to transmit the supervisory control signal to each optical node.

17 Claims, 26 Drawing Sheets

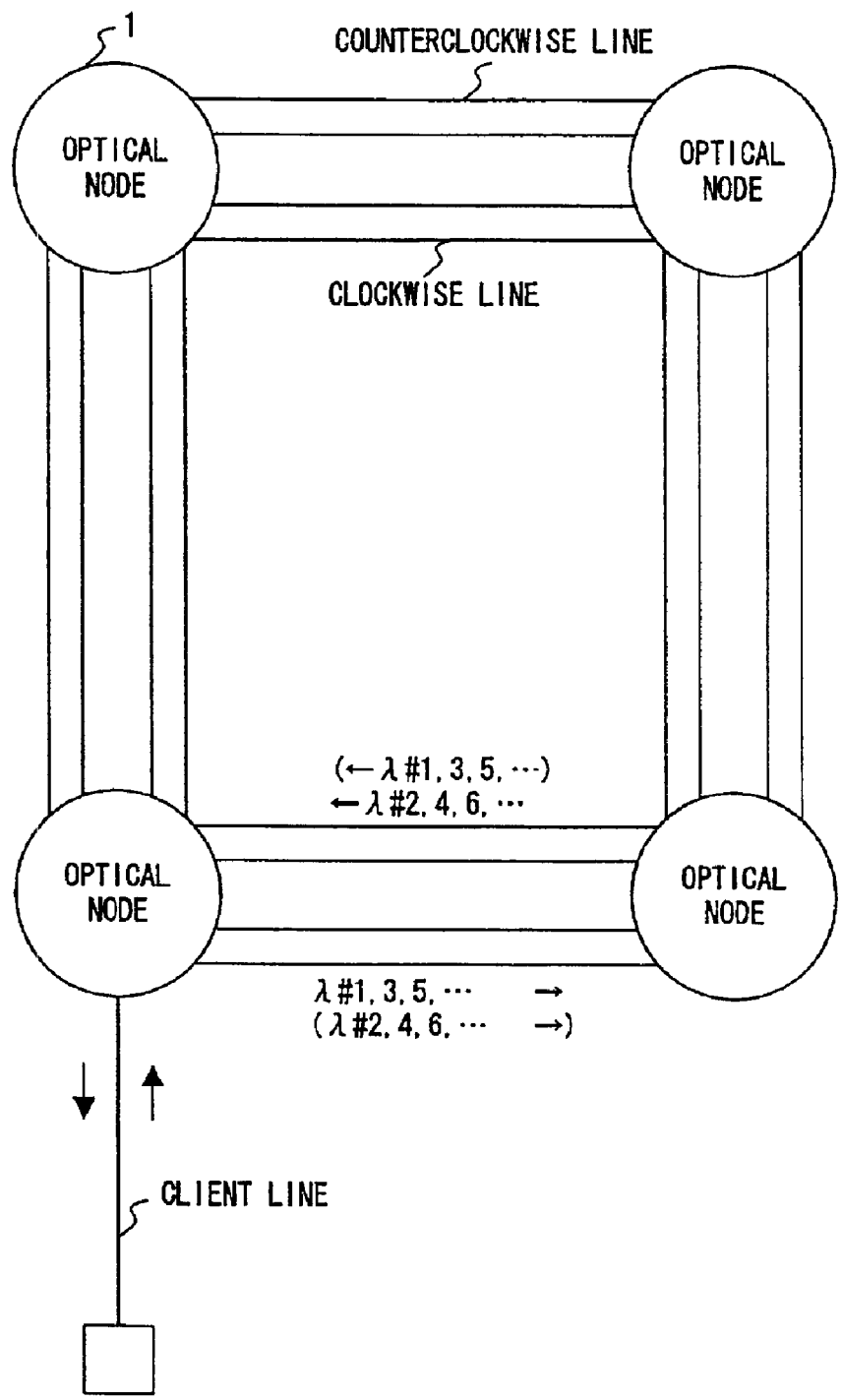
F I G. 1

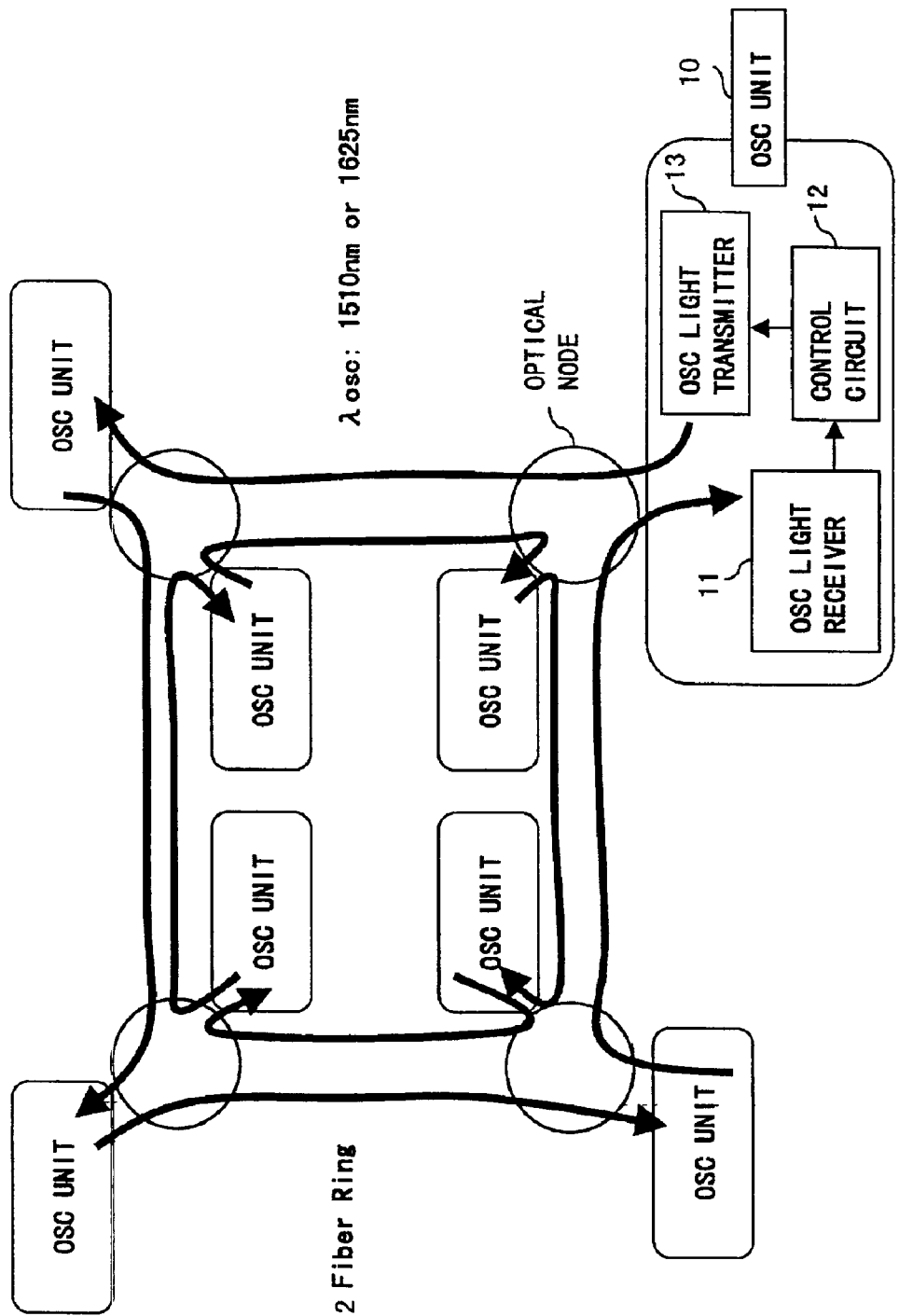
F I G. 2

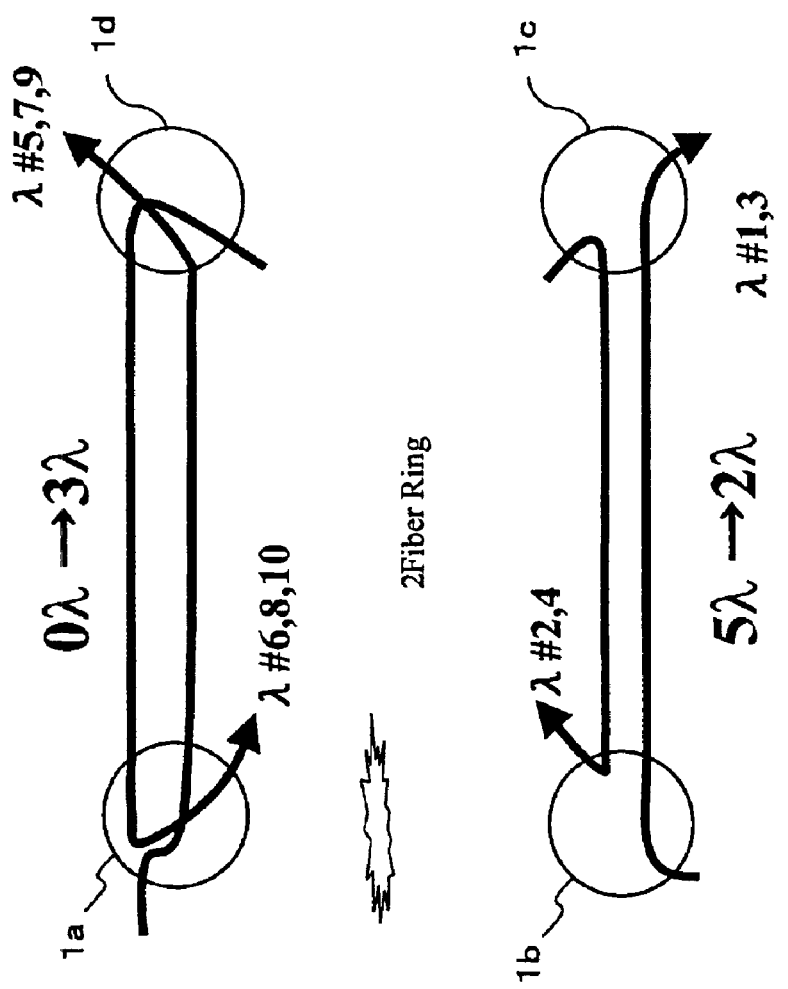
F I G. 5

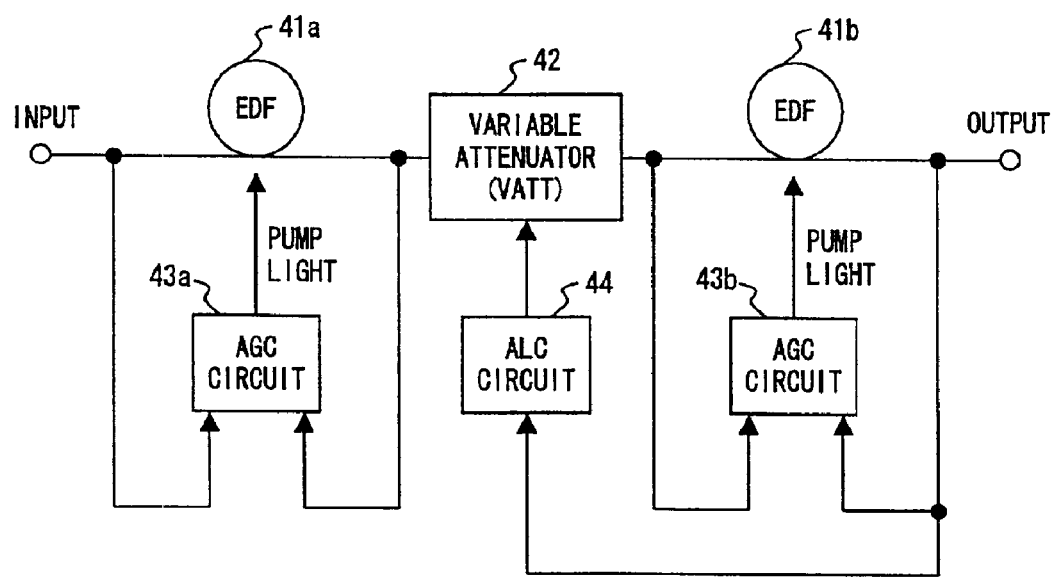
F I G. 6

OPTICAL AMPLIFIER AMPLIFYING WAVELENGTH MULTIPLEXED LIGHT, AND WAVELENGTH MULTIPLEXED LIGHT COMMUNICATIONS SYSTEM

BACKGROUND OF THE INVENTION

1. Field of the Invention

The present invention relates to an optical amplifier and an optical communications system, and more particularly, to an optical amplifier amplifying wavelength multiplexed light, and a wavelength multiplexed light communications system.

2. Description of the Related Art

With the popularization of the Internet, an image data transmission service, etc., the amount of information transmitted via a network has been rapidly increasing, and a WDM (Wavelength Division Multiplex) optical communications system has been being introduced to cope with this phenomenon. The WDM optical communications system has been being introduced not only into a long-haul trunk system but also a metro-ring network.

In the long-haul trunk system, optical amplifiers are normally arranged at predetermined intervals, and each of the optical amplifiers amplifies wavelength multiplexed light in ALC (Automatic Level Control) mode or AGC (Automatic Gain Control) mode according to circumstances. Here, the ALC mode is an operation mode in which the output of an optical amplifier is held to be a predetermined level, whereas the AGC mode is an operation mode in which the gain of an optical amplifier is held to be a predetermined value.

Each of the optical amplifiers normally operates in the ALC mode in order to stabilize its optical level diagram. When the number of wavelengths of wave multiplexed light increases or decreases, the operation mode of each of the optical amplifiers is switched from the ALC mode to the AGC mode according to a control signal from a terminal station. Here, the time constant (response time) of the ALC is set to several tens to several hundreds of milliseconds in order to facilitate an implementation of an ALC circuit, and to suppress the influence of PDL (Polarization Dependent Loss). In the meantime, the time constant (response time) of the AGC is set to several tens of milliseconds. "The time constant (response time) of the ALC" means, for example, a time period from when the input/output level of an optical amplifier changes till when the power of pump light or a loss in a variable attenuator is suitably adjusted to make the output level revert to a predetermined level to be held, although this meaning is not uniquely defined. In the meantime, "the time constant (response time) of the AGC" means, for example, a time period from when the input/output level of an optical amplifier changes till when the power of pump light is suitably adjusted to make the gain of the optical amplifier revert to a predetermined value to be held, although this meaning is not uniquely defined. An optical amplifier having the ALC mode and the AGC mode is recited in detail, for example, by Japanese Patent Publication No. 2000-151515.

In a metro-ring network, a plurality of optical nodes are connected in the form of a ring, and the above described optical amplifier is arranged within each of the plurality of optical nodes. Here, in the metro-ring network, the frequency of a change in the number of wavelengths of wavelength multiplexed light is high in comparison with a long-haul trunk system due to the following reasons.

(1) A path is established/released between arbitrary optical nodes depending on need.

(2) For IP over WDM suitable for an IP network, it is desirable that a protection function is provided by a WDM system. Here, considering the demand for independency from a bit rate, a method switching a wavelength in an optical layer is promising as the protection function. With this method, however, the number of wavelengths increases/decreases in a transient manner.

(3) In the future, a time-based wavelength leasing service is expected to be rendered. In this case, a path is frequently established/released between arbitrary optical nodes.

As described above, the number of wavelengths of wavelength multiplexed light frequently changes in a metro-ring network. An optical amplifier within each optical node amplifies wavelength multiplexed light while suitably switching its operation mode each time the number of wavelengths changes.

To reduce the cost of an optical communications system, the cost of components configuring an optical node or an optical amplifier must be cut down. As one embodiment, configuration using an avalanche photodiode (APD) that is relatively cheap instead of using the combination of optical pre-amplifier and PIN photodiode is known up to now.

However, at a 10-Gbps transmission speed, the dynamic range of optical receiver using APD is normally narrow, and the output level of an optical amplifier must control output power level of each channel within the narrowest possible range considering the tilt of wavelength multiplexed light (wavelength dependency of an optical level), a variation in the loss characteristic of an optical component, the impact due to a change in an external environment, etc. For example, at the 10-Gbps transmission speed, the dynamic range of a optical receiver using APD is about ±10 dB in the system using optical amplifier. Here, a variation in a loss in a demultiplexer arranged in an optical node is about ±2 dB, and also the tilt of wavelength multiplexed light is on the order of ±2 dB. Assuming that the range where an ambient temperature changes is 60 degrees, and the length of a transmission line between two nodes is 100 km, a variation of up to 1.8 dB or so occurs in an optical level. Accordingly, when the variation of the output level of an optical amplifier is large, the input power level of optical receiver goes out of its dynamic range. In result, it leads to an occurrence of a reception error.

However, with an existing optical amplifier, a variation in its output level is difficult to be suppressed due to the following reasons.

(1) An optical amplifier normally operates in the ALC mode, and in the AGC mode when the number of wavelengths of wavelength multiplexed light changes as described above. At this time, wavelength number information is notified, for example, by a control signal transmitted via each optical node. However, this control signal is normally interpreted after being converted into an electric signal at each node, reconverted into an optical signal, and transferred to the next optical node while 3R (regenerating, reshaping, and retiming) operations are performed. Accordingly, it sometimes takes several hundreds of milliseconds to several seconds from when the number of wavelengths of wavelength multiplexed light changes till when the wavelength number information reaches each optical node. In the meantime, in the ALC mode, the output level of an optical amplifier is controlled to become a predetermined level which corresponds to the number of wavelengths of wavelength multiplexed light. At this time, the number of wavelengths is notified with the above described wavelength number information. Accordingly, the optical amplifier operates to maintain the output level which corresponds to the number of wavelengths before the change for the time period from when the number of wavelengths changes till when the wavelength number information is notified (several hundreds of milliseconds to several seconds in the above provided example). As a result, the output level of each wavelength varies. For example, if the number of wavelengths of wavelength multiplexed light increases from three to five, an optical amplifier which operates in the ALC mode amplifies wavelength multiplexed light by assuming that the three wavelengths are multiplexed, for a time period until receiving the wavelength number information. Therefore, the output level of each of the wavelengths significantly drops.

(2) In the AGC mode, the power of pump light is adjusted according to a change in an input level, so that an output power changes to maintain a predetermined gain. However, as the time constant of the AGC mode, a value longer than the response time of an optical amplifier is normally used. Here, "the response time of an optical amplifier" means, for example, a time period from when the power of pump light supplied to an amplification medium of the optical amplifier changes till when an excited state corresponding to the power of the pump light is obtained in the amplification medium, although this meaning is not uniquely defined. Accordingly, if the optical amplifier operates in the AGC mode, the power of pump light cannot follow a change in the input level. As a result, a state where a suitable gain cannot be obtained occurs in a transient manner. For example, if total input power drops suddenly due to a decrease in the number of wavelengths of wavelength multiplexed light, the optical amplifier that operates in the AGC mode amplifies wavelength multiplexed light by assuming that the state before the total input power drops continues, for a time period required to suitably adjust the power of pump light. Therefore, in this case, the output level of each wavelength rises temporarily.

(3) In the AGC mode, the power of pump light is controlled to make the ratio of an input level to an output level constant. However, a signal gain deviates from a target value due to ASE (Amplified Spontaneous Emission) light generated in an optical amplification medium (such as an erbium-doped fiber).

(4) In the AGC mode, the power of pump light is controlled to make the ratio of an input level to an output level constant. Therefore, if input light is suspended in a protection operation, etc. of a communications system, etc., a gain control system becomes unstable. Accordingly, a surge (here, a phenomenon that the output level of an optical amplifier temporarily becomes much higher than regular output level) can possibly occur, when the optical amplifier makes a transition from the state where the input light is suspended to the state where the signal light is input.

As described above, the output level of an existing optical amplifier sometimes varies if its input level changes (including the case where the number of wavelengths of wavelength multiplexed light changes).

SUMMARY OF THE INVENTION

An object of the present invention is to obtain a stable output level in an optical amplifier amplifying wavelength multiplexed light.

An optical amplifier according to the present invention, which is an arbitrary optical amplifier among a plurality of optical amplifiers used in an optical communications system transmitting wavelength multiplexed light, comprises an optical amplification medium and an optical attenuator. The optical amplifier further comprises a gain controlling circuit holding the gain of the optical amplification medium to be a predetermined value, and a level controlling circuit controlling a loss in the attenuator so that the output level of the optical amplifier is held to be a value corresponding to a control signal notified to each of the plurality of optical amplifiers within the optical communications system. Furthermore, a time constant of the level controlling circuit is longer than a time period required to notify the control signal to each of the plurality of optical amplifiers within the optical communications system.

If the number of wavelengths of input wavelength multiplexed light changes, the output level of the wavelength multiplexed light varies. Note that, however, the output level of each wavelength does not vary at this moment. The level controlling circuit adjusts a loss in the optical attenuator so that the output level reverts to the original state at a speed corresponding to a set time constant. Thereafter, when a new number of wavelengths of the wavelength multiplexed light is notified by the control signal, the operations of the optical amplifier are controlled according to the control signal. Here, the time constant of the level controlling circuit is much longer than the time period required to notify the control signal to the optical amplifier. Therefore, the output level of the wavelength multiplexed light does not significantly vary due to the level controlling circuit for a time period from when the number of wavelengths of the wavelength multiplexed light changes till when the optical amplifier receives the control signal. Accordingly, a variation in the output power of each of the wavelengths of the wavelength multiplexed light is small.

In this optical amplifier, a loss in the optical attenuator may be fixed when a change in the number of wavelengths of wavelength multiplexed light is notified by the control signal. With this configuration, the operation mode of the optical amplifier can make a transition from the state of operating in ALC (Automatic Level Control) mode to the state of operating in AGC (Automatic Gain Control) mode.

An optical amplifier according to another feature of the present invention comprises an optical amplification medium, an optical attenuator, a gain controlling circuit holding the gain of the optical amplification medium to be a predetermined value, and a level controlling circuit controlling a loss in the optical attenuator so that the output level of the optical amplifier is held to be a predetermined level. The gain controlling circuit comprises a detecting unit detecting the input power and the output power of the optical amplification medium, a calculating unit calculating the gain of the optical amplification medium based on the input and the output powers detected by the detecting unit, and a pump light controlling unit controlling the power of pump light to be supplied to the optical amplification medium according to the gain calculated by the calculating unit. The calculating unit calculates the gain of the optical amplification medium based on the ratio of the value obtained by adding the equivalent value at the input of optical amplification medium for the amplified spontaneous emission noise generated in optical amplification medium, to the output power.

With this configuration, the influence of spontaneously emitted light is eliminated, when the gain of the optical amplification medium is calculated. Accordingly, the output level is accurately controlled so that a gain to a signal becomes constant. Additionally, the calculating unit calculates the gain based on the ratio of the input power, to which a value corresponding to the power of spontaneously emitted light is added, to the output power. Accordingly, even if a signal input is suspended, the operations of the level controlling circuit can be prevented from becoming unstable. This is because "0" is not input to the calculating unit.

BRIEF DESCRIPTION OF THE DRAWINGS

FIG. 1 exemplifies the configuration of an optical communications system in which optical amplifiers according to an embodiment of the present invention are used;

FIG. 2 explains the control system of the optical communications system according to the embodiment;

FIG. 5 shows the state where a fault occurs (protection state);

FIG. 6 shows the fundamental configuration of the optical amplifier according to the embodiment of the present invention;

DESCRIPTION OF THE PREFERRED EMBODIMENTS

Figure 3:
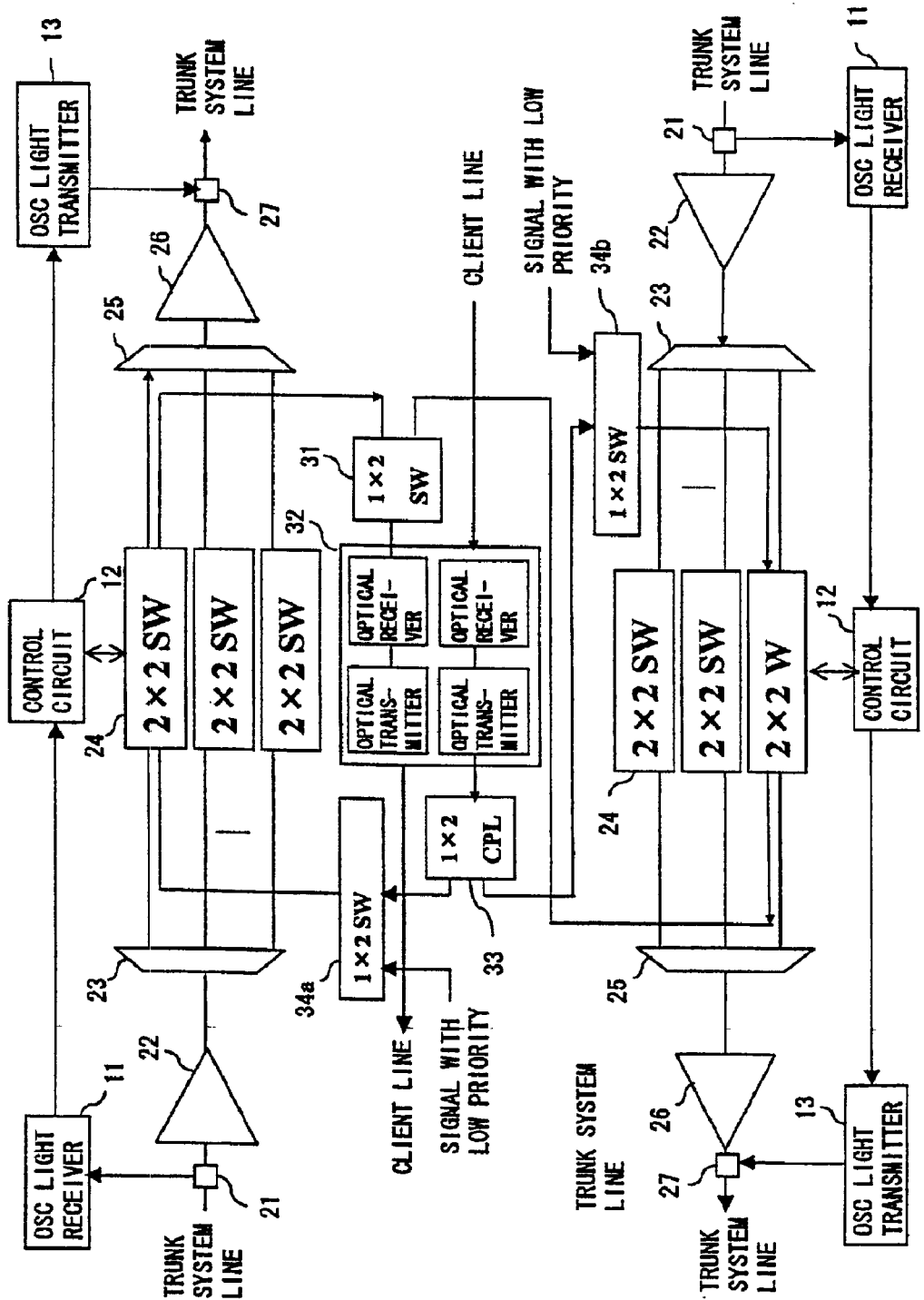
FIG. 3 shows the configuration of an optical node.

Hereinafter, embodiments according to the present invention are described with reference to the drawings.

FIG. 1 exemplifies the configuration of an optical communications system in which optical amplifiers according to a embodiment of the present invention are used. Here, the optical communications system having transmission lines in the form of a ring are adopted. However, the present invention is not limited to this system, and applicable to an optical communications system in which two or more points are connected by an arbitrary path.

This optical communications system is configured by connecting a plurality of optical nodes 1 in the form of a ring with optical fibers. Here, the plurality of optical nodes 1 are respectively connected by a pair of optical fibers (clockwise and counterclockwise lines), and dual rings are formed. Wavelength multiplexed lights are transmitted over the clockwise and the counterclockwise lines. Specifically, over the clockwise line, working system signals are transmitted by using wavelengths $\lambda 2, \lambda 4, \lambda 6, \ldots$, and protection system signals (or signals with low priority) are transmitted by using wavelengths $\lambda 1, \lambda 3, \lambda 5 \ldots$. In the meantime, over the counterclockwise line, working system signals are transmitted by using wavelengths $\lambda 1, \lambda 3, \lambda 5, \ldots$, and protection system signals (or signals with low priority) are transmitted by using wavelengths $\lambda 2, \lambda 4, \lambda 6 \ldots$.

Each of the optical nodes 1 comprises an optical amplifier, amplifies input wavelength multiplexed light, and transmits the amplified light to the next optical node. Additionally, each of the optical nodes 1 can accommodate one or more client lines. Additionally, each of the optical nodes 1 comprises a function (drop function) for guiding arbitrary signal light within the wavelength multiplexed light received from a trunk system line (the clockwise or the counterclockwise line) to a client line, and a function (add function) for multiplexing the signal light received from the client line to the trunk system line.

FIG. 2 explains the control system of the optical communications system according to the embodiment. Each of the optical nodes 1 comprises a supervisory controlling (OSC) unit 10. Here, the OSC unit 10 generates/transfers a supervisory control signal for monitoring and controlling the operation state of the optical communications system, and controls the operations of an optical amplifier, etc. according to a received supervisory control signal. Specifically, a receiver 11 converts the supervisory control signal received from a corresponding optical node into an electric signal, and passes the electric signal to a control circuit 12. The control circuit 12 controls the optical amplifier, etc. within the local node according to the received supervisory control signal, and updates the supervisory control signal as occasion demands. A transmitter 13 converts the supervisory control signal into an optical signal, and transmits the signal to the next optical node. Here, the OSC unit performs 3R (regeneration, reshaping, and retiming) operations for the supervisory control signal. Notice that the supervisory control signal is transmitted by using a predetermined wavelength (for example, 1510 nm or 1625 nm). Furthermore, the supervisory control signal transports at least wavelength number information which represents the number of wavelengths of wavelength multiplexed light transmitted over a trunk system line.

As described above, the state of the optical communications system according to this embodiment is monitored and its operations are controlled by the supervisory control signal.

FIG. 3 shows the configuration of an optical node. Here, the optical node 1 has the function for amplifying wavelength multiplexed light transmitted over a trunk system line, the drop function, and the add function as described above. Note that the wavelength multiplexed light includes a plurality of signal lights, and OSC light transporting a supervisory control signal.

The input wavelength multiplexed light is amplified by an optical pre-amplifier 22, then demultiplexed to respective wavelengths by a demultiplexer 23. A WDM coupler 21 which is arranged at a stage preceding the optical pre-amplifier 22 guides the OSC light included in the wavelength multiplexed light to a receiver 11. Signal lights with respective wavelengths demultiplexed by the demultiplexer 23 are guided to corresponding optical switches 24. A multiplexer 25 multiplexes the plurality of signal lights output from the optical switches 24. The wavelength multiplexed light output from the multiplexer 25 is amplified by an optical post-amplifier 26, then output to a trunk system line. A WDM coupler 27 arranged at a stage succeeding the optical post-amplifier 26 couples the wavelength multiplexed light with the OCS light.

An optical switch 31 selects one of signal lights guided from two trunk system lines (clockwise and counterclockwise lines). Additionally, a transponder (an add/drop circuit) 32 guides the signal light selected by the optical switch 31 to a client line, and also guides the signal light received from the client line to optical switches 34a and 34b via an optical splitter (a coupler) 33. The optical switches 34a and 34b select a main signal and a signal with low priority, and guide the received signals to the corresponding switches 24. Each of the optical switches 24 selects the signal light from the trunk system line or the signal light from the client line according to an instruction from a control circuit 12, and guides the selected signal light to the multiplexer 25 or the transponder 32.

Figure 4:
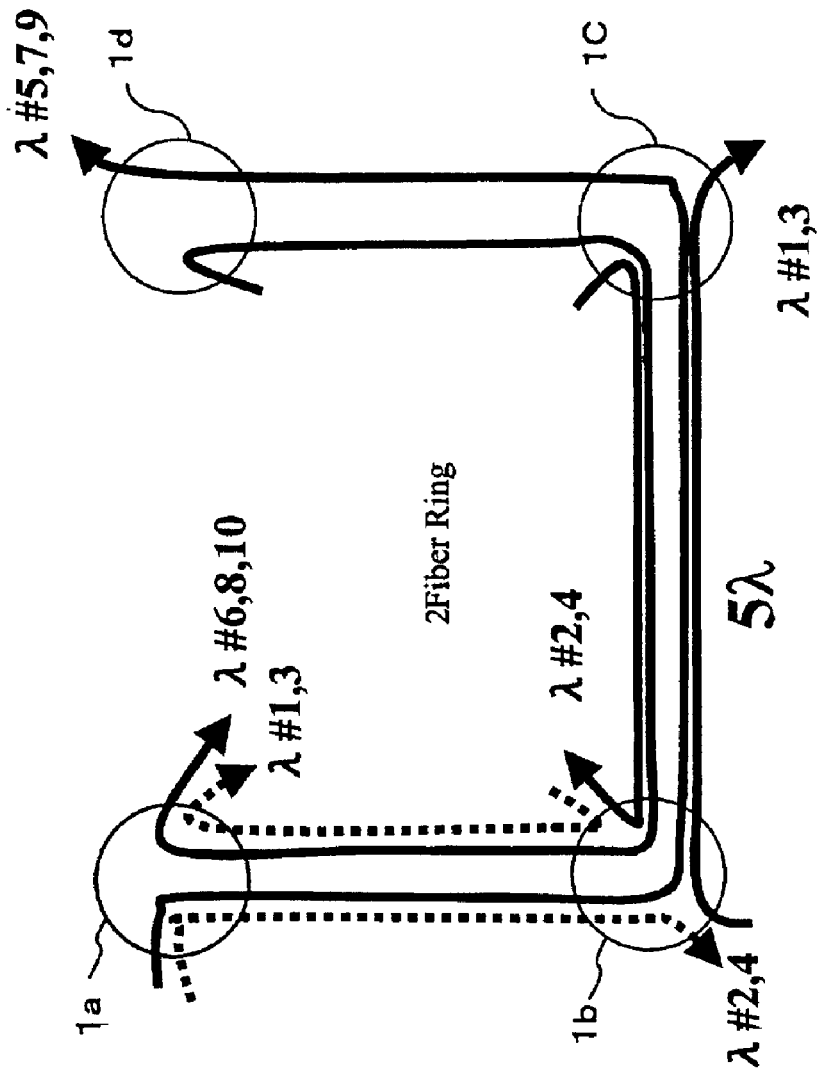
FIG. 4 shows the state where a fault does not occur (non-protection state)

FIGS. 4 and 5 explain a protection operation in the optical communications system according to the embodiment. The "protection operation" means an operation intended to reestablish a path or a route for transmitting a signal, when a line fault, etc. occurs.

FIG. 4 shows the state where a fault does not occur (non-protection state). Here, solid lines indicate paths for transmitting a working system signal, whereas broken lines indicate paths for transmitting a protection system signal (or a signal with low priority).

In FIG. 4, on a counterclockwise line, 3 paths (λ#5, λ#7, and λ#9) for transmitting a working system signal from an optical node 1a to an optical node 1d, 2 paths (λ#1 and λ#3) for transmitting a working system signal from the optical node 1b to an optical node 1c, and 2 paths (λ#2 and λ#4) for transmitting a protection system signal with low priority from the optical node 1a to the optical node 1b are established. On a clockwise line, 3 paths (λ#6, λ#8, and λ#10) for transmitting a working system signal from the optical node 1d to the optical node 1a, 2 paths (λ#2 and λ#4) for transmitting a working system signal from the optical node 1c to the optical node 1b, and 2 paths (λ#1 and λ#3) for transmitting a signal with low priority from the optical node 1b to the optical node 1a are established.

The number of wavelengths of wavelength multiplexed light transmitted via a trunk system line varies depending on a location. For example, wavelength multiplexed light into which five wavelengths (λ1, λ3, λ5, λ7, and λ9) are multiplexed is transmitted over the counterclockwise line between the optical nodes 1b and 1c. Accordingly, in this case, an optical pre-amplifier arranged for the counterclockwise line in the optical node 1c amplifies the wavelength multiplexed light into which the five wavelengths are multiplexed. In the meantime, no path is established on the counterclockwise line between the optical nodes id and 1a.

Accordingly, in this case, no wavelength multiplexed light is input to an optical pre-amplifier arranged for the counterclockwise line in the optical node 1a.

FIG. 5 shows the state (protection state) where a fault occurs between the optical nodes 1a and 1b. In this case, a path for transmitting a working system signal among paths established by using the transmission line on which the fault occurs is reestablished via another route. Specifically, the three paths (λ#5, λ#7, and λ#9) established on the counterclockwise line in FIG. 4 are reestablished as three paths (λ#5, λ#7, and λ#9) established on the clockwise line. Similarly, the three paths (λ#6, λ#8, and λ#10) established on the clockwise line in FIG. 4 are reestablished as three paths (λ#6, λ#8, and λ#10) established on the counterclockwise line. On the other hand, a signal with low priority, which has been transmitted over the transmission line on which the fault occurs, is suspended.

As a result, wavelength multiplexed light into which two wavelengths are multiplexed is input to the optical node 1c over the counterclockwise line. Namely, the number of wavelengths of the wavelength multiplexed light, which is input to the optical pre-amplifier arranged for the counterclockwise line within the optical node 1c, decreases from "5" to "2" due to the occurrence of the fault shown in FIG. 5. In the meantime, wavelength multiplexed light into which three wavelengths are multiplexed is input to the optical node 1a over the counterclockwise line. Namely, the number of wavelengths of the wavelength multiplexed light, which is input to the optical pre-amplifier for the counterclockwise line within the optical node 1a, increases from "0" to "3" due to the occurrence of the fault shown in FIG. 5.

As described above, in the optical communications system according to this embodiment, once the protection is started due to an occurrence of a fault, the number of wavelengths of wavelength multiplexed light, which is input to an optical amplifier, changes in one or a plurality of optical nodes. With the optical amplifier according to this embodiment, a variation in its output level is suppressed to be small even if the number of wavelengths of wavelength multiplexed light changes as described above.

FIG. 6 shows the fundamental configuration of the optical amplifier according to the embodiment of the present invention. This optical amplifier is arranged in each optical node, and corresponds to, for example, the optical pre-amplifier 22 or the optical post-amplifier 26, which is shown in FIG. 3. The optical amplifier amplifies wavelength multiplexed light in the AGC mode or the ALC mode.

This optical amplifier has a two-stage amplification configuration, and comprises erbium-doped fibers (EDFs) 41a and 41b as optical amplification media. Note that the optical amplification media are not limited to erbium-doped fibers, and may be rare-earth-doped fibers with a different element. Additionally, a variable attenuator (VATT) 42 adjusting an optical level is arranged between the EDFs 41a and 41b.

An AGC circuit 43a comprises a pump light source for supplying pump light to the EDF 41a. The AGC circuit 43a monitors the input/output level of the EDF 41a, and adjust the power of pump light to hold the gain of the EDF 41a to be a predetermined constant value. Similarly, an AGC circuit 43b comprises a pump light source for supplying pump light to the EDF 41b. The AGC circuit 43b monitors the input/output level of the EDF 41b, and adjusts the power of pump light to hold the gain of the EDF 41b to be a predetermined constant value. An ALC circuit 44 controls a loss in the variable attenuator 42 to hold the output level of the optical amplifier (namely, the output level of the EDF 41b) to be a predetermined value.

While this optical amplifier operates in the AGC mode, a loss in the optical attenuator 42 is fixed to a suitable value. The AGC circuits 43a and 43b suitably control the respective gains of the EDFs 41a and 41b. In the meantime, while this optical amplifier operates in the ALC mode, the ALC circuit 44 controls a loss in the variable attenuator 42 so that the output level is held to be a value corresponding to the number of wavelengths of wavelength multiplexed light. At this time, the gains of the EDFs 41a and 41b are respectively held to be suitable values by the AGC circuits 43a and 43b. The number of wavelengths of wavelength multiplexed light is notified by using the supervisory control signal which is explained with reference to FIG. 2.

Time constants of the AGC and the ALC are set as follows in this optical amplifier.

(1) The time constant of the AGC is made sufficiently short in comparison with the response times of the EDFs 41a and 41b.
(2) The time constant of the ALC is made longer than the amount of time required to transmit the supervisory control signal to each optical node.

Figure 7:
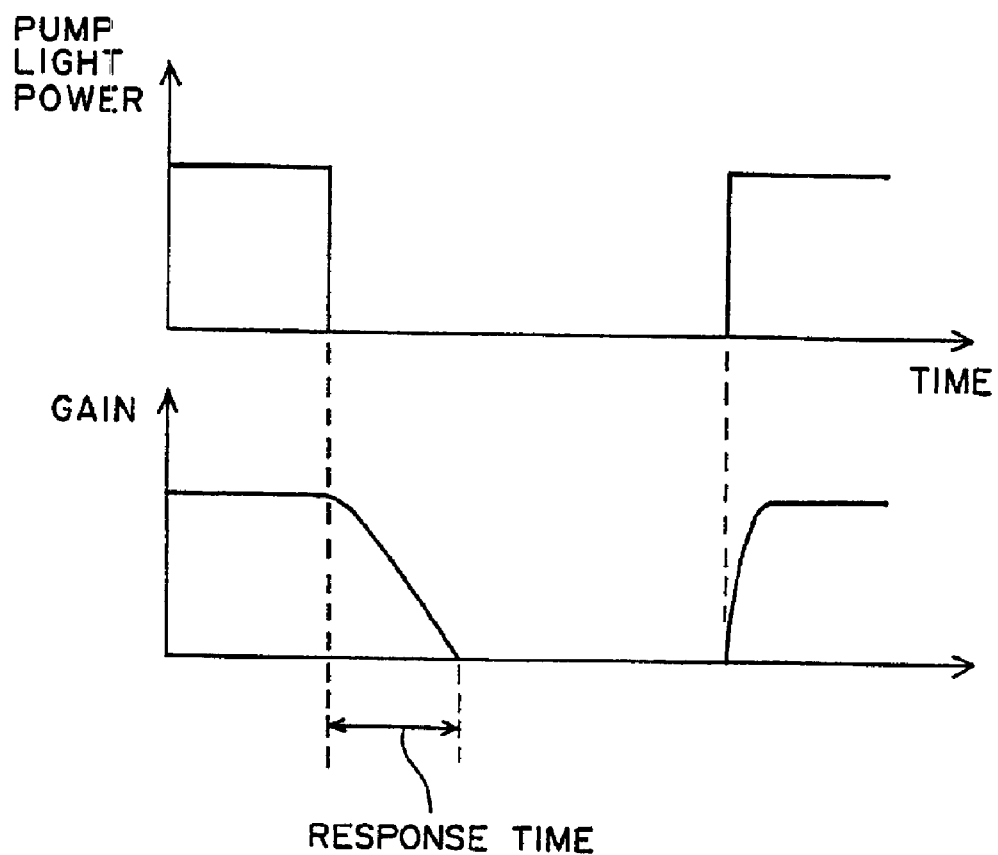
FIG. 7 explains a response time of an optical amplification medium.

FIG. 7 explains the response time of an optical amplification medium. The gain of the optical amplification medium is controlled by pump light. Namely, as the power of pump light decreases, so does the gain of the optical amplification medium. Similarly, as the power of pump light increases, so does the gain of the optical amplification medium. However, it takes certain amount of time from when the power of pump light changes till when the gain of the optical amplification medium is adjusted according to the change. Normally, the response time becomes longer not when the power of pump light increases, but when the power decreases. The response time of the optical amplification medium is determined depending on its material. For instance, the response time of an EDF is on the order of several milliseconds.

Figure 8A:
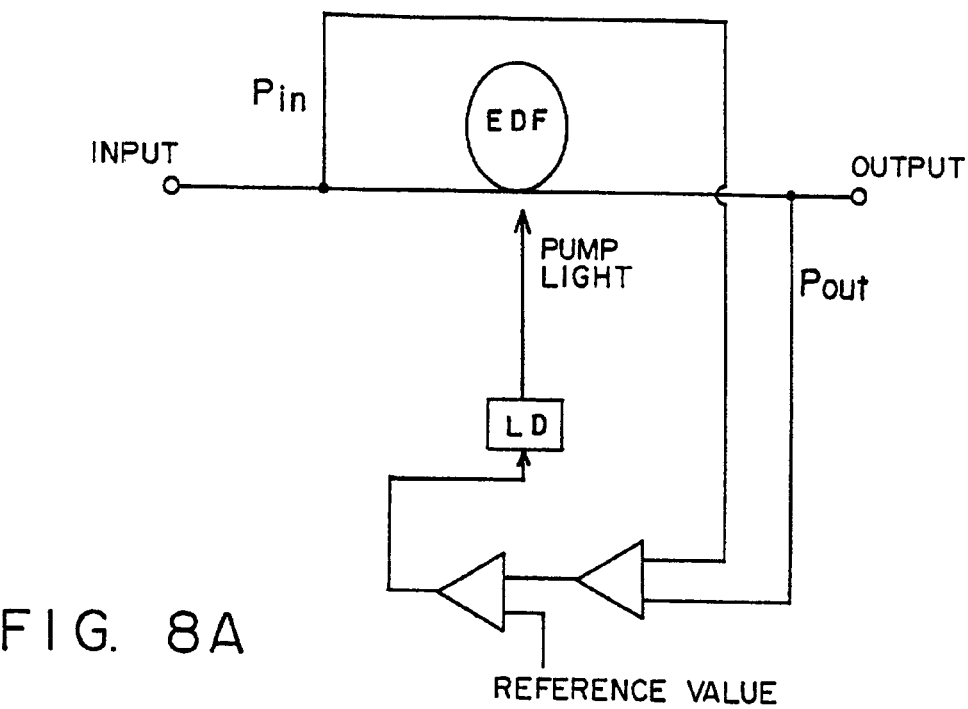
FIGS. 8A and 8B explain a time constant of AGC.
Figure 8B:
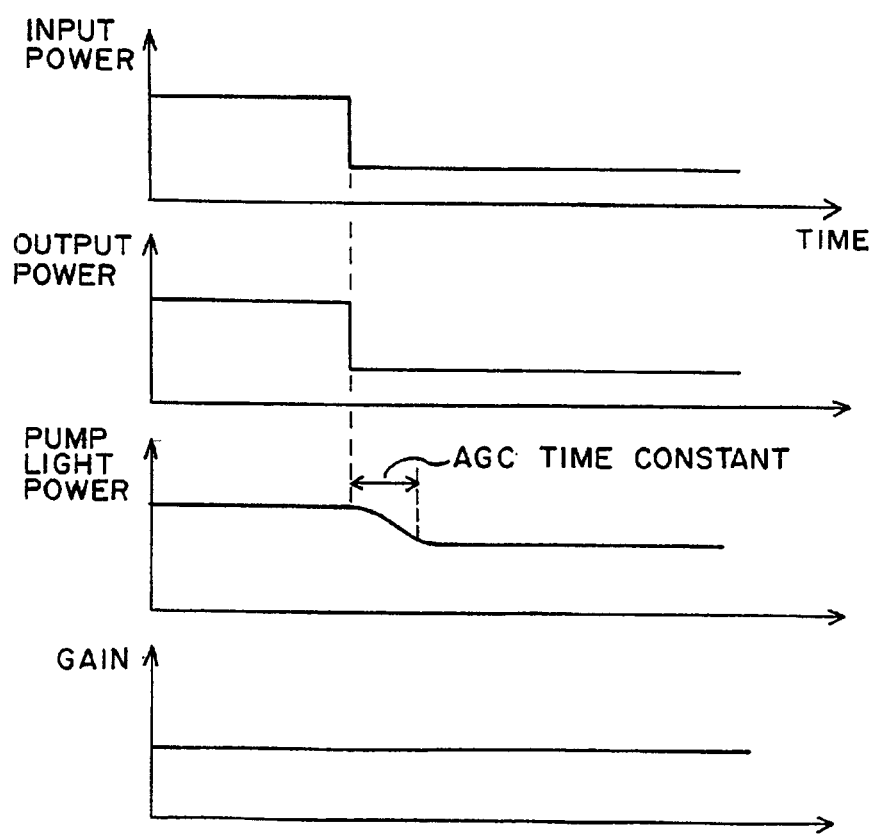

FIGS. 8A and 8B explain the time constant of the AGC. Here, assume that the AGC circuit (43a or 43b) comprises, as shown in FIG. 8A, a function for calculating a gain based on the ratio of the input power to the output power of the EDF (41a or 41b), a function for making a comparison between the calculated gain and a reference value, and a pump light source generating pump light corresponding to the result of the comparison.

As shown in FIG. 8B, while the input power is stable, also the output power is stable and the gain is constant. However, the gain of the EDF is dependent on the input power. To be more specific, for example, if the input power decreases when predetermined pump light is supplied, the gain of the EDF tends to become larger. Accordingly, when the input power changes, the AGC circuit must suitably adjust the power of pump light according to a change. Here, if the AGC circuit follows the change in a sufficiently short time period even when the input power changes, the gain is held constant.

The power of pump light is usually controlled based on input power and output power. To suitably adjust the power of pump light according to a change in the input power, a process for calculating a gain based on the ratio of input power to output power, a process for obtaining the difference between the calculated gain and a reference value, and the like are required. Accordingly, it is difficult to reduce the response time of the AGC circuit to "0".

However, it is possible to make the response time sufficiently short. Namely, the response time of the AGC circuit is highly dependent on the response time of an amplifier that operates as a divider for calculating the gain, and the response time of an amplifier for obtaining the difference. Therefore, the response time of the AGC circuit is shortened by improving the speeds of the amplifiers. A circuit which controls an EDF by using a high-speed AGC circuit is recited, for example, by OFC2001 PD38-1.

In the optical amplifier according to this embodiment, the time constant (response time) of the AGC is set to be shorter than the response time of an optical amplification medium. By way of example, the time constant of the AGC is set to one hundredth of the response time of the optical amplification medium. Accordingly, the gain is held constant even if a change occurs in the input power. Namely, if the input power per wavelength does not change, also the output power per wavelength does not vary even when the number of wavelengths of wavelength multiplexed light changes.

Figure 9A:
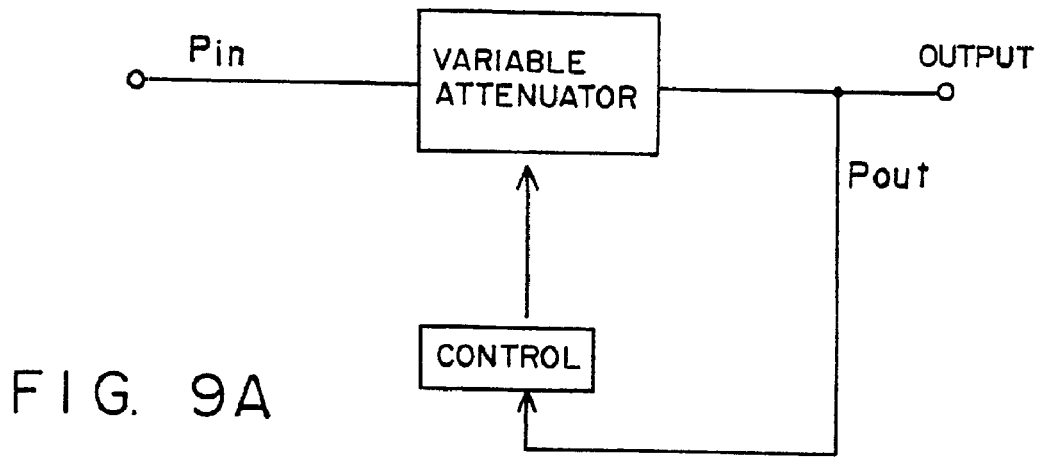
FIGS. 9A and 9B explain a time constant of ALC.
Figure 9B:
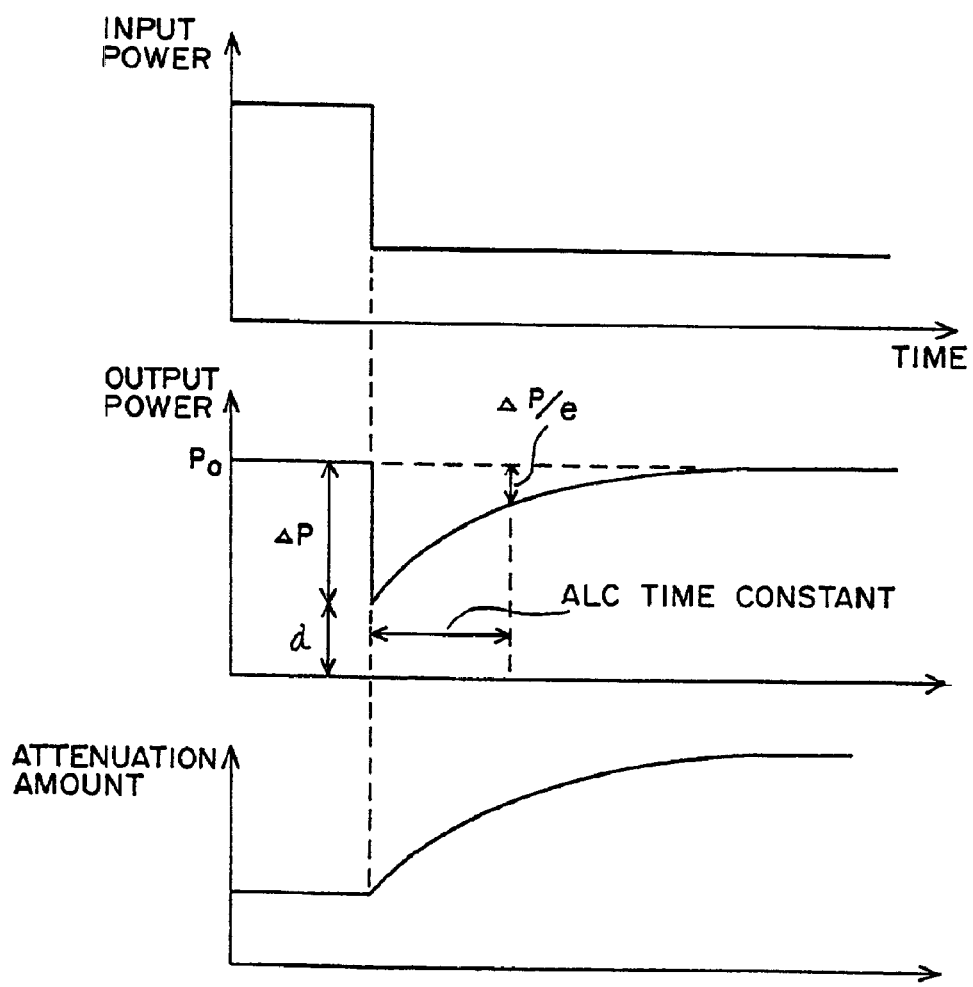

FIGS. 9A and 9B explain the time constant of the ALC. Here, assume that the ALC circuit (44) has a function for controlling a loss in the variable attenuator (42) based on output power as shown in FIG. 9A.

As shown in FIG. 9B, when the input power changes, also the output power varies according to the change. Here, the ALC circuit adjusts a loss in the variable attenuator in order to hold the output power constant. At this time, a change in the loss is represented, for example, by using an exponential function. Specifically, a change in the loss is defined in the following equation which represents the output power. In the following equation, "$\Delta P$" represents the amount of change in total output power when the input power changes, and "T" represents a predetermined time constant. Additionally, "t" represents the amount of time measured from the timing when the input power changes, and "$\alpha$" represents the output power in the case of t=0.

$$Pout = \Delta P(1 - e^{-t/T}) + \alpha$$

According to this equation, an error of the output power at the timing when the time "T" elapses from the change occurred in the input power is reduced to "$\Delta P/e$". Hereinafter, the time "T" is sometimes referred to as "the time constant of the ALC" or "the response time of the ALC".

The time constant (response time) of the ALC is set to be longer than the amount of time required to transmit the supervisory control signal to each optical node. Specifically, the time constant of the ALC is set to, for example, 10 times or more of the amount of time required to transmit the supervisory control signal to each optical node. Here, the amount of time required to transmit the supervisory control signal to each optical node is given by a sum of a delay time in each optical node, propagation time of a signal, protection time, and wavelength number processing time. The delay time in each optical node includes the time required for the 3R operations. The propagation time of a signal is dependent on the length of a transmission line. The protection time is defined, for example, as a standard of the SONET, etc., and is 50 to 100 milliseconds. The wavelength number processing time is a time period from when the number of wavelengths of wavelength multiplexed light is notified by a supervisory control signal till when the settings of the ALC circuit are changed according to the number of wavelengths.

Assuming that the maximum number of wavelengths of wavelength multiplexed light is 40, "T=100 seconds" is obtained according to the above provided equation in order to suppress a variation in the output level of the optical amplifier to 0.1 dB or lower when the number of wavelengths changes.

If the response time of the optical amplification medium and the time constant of the AGC, the response time of the optical amplification medium and the time constant of the ALC, or the time constant of the AGC and that of the ALC match or close to each other, undesired oscillation, etc. can possibly occur in the control system of the optical amplifier. However, in the optical amplifier according to the embodiment, the time constant of the AGC is set to be sufficiently short in comparison with the response time of the EDF. In the meantime, the time constant of the ALC is set to be longer than the amount of time required to transmit the supervisory control signal to each optical node. Therefore, it becomes sufficiently long in comparison with the response time of the EDF. Accordingly, the control system does not become unstable due to the oscillation, etc.

Figure 10:
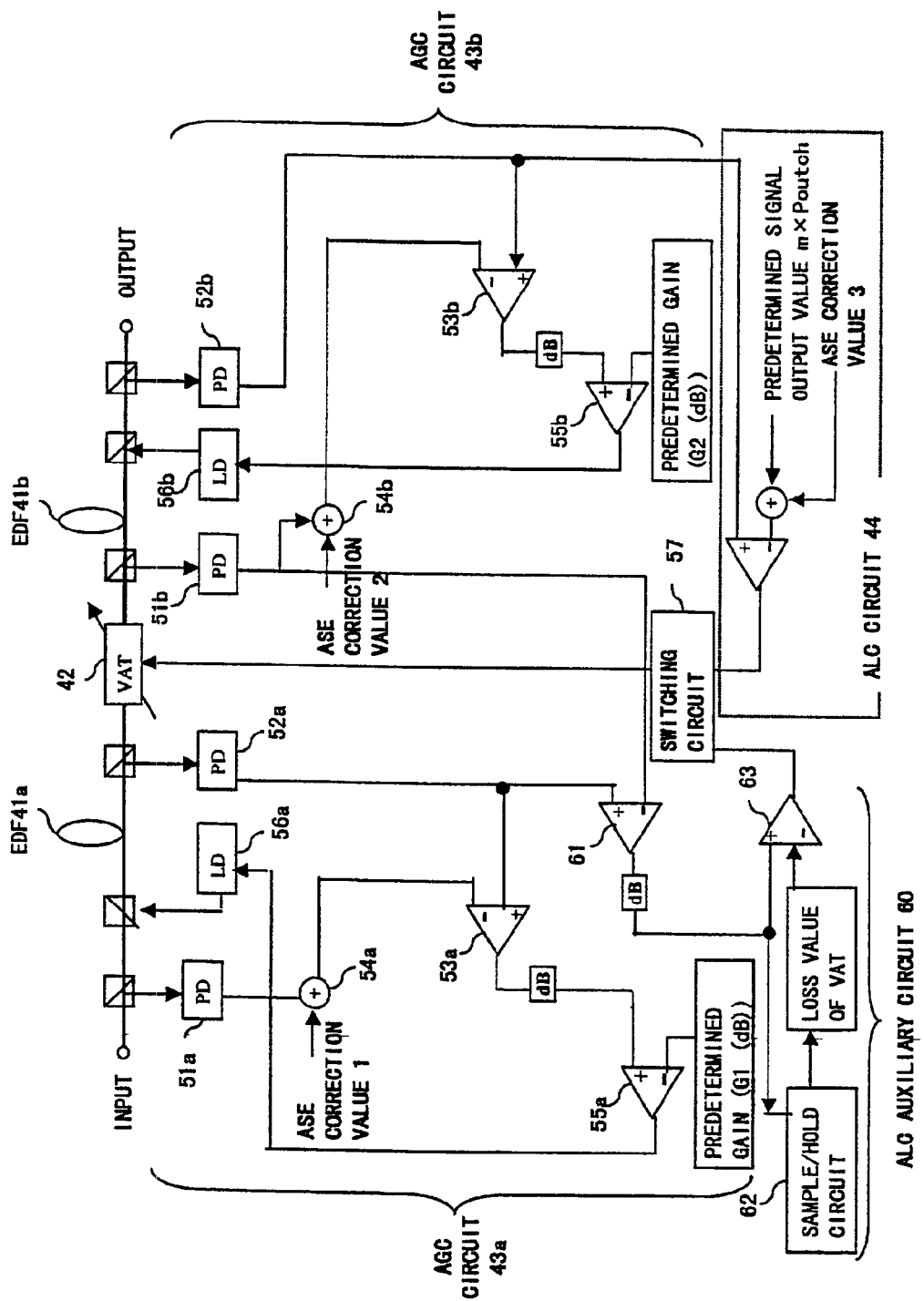
FIG. 10 shows the configuration of the optical amplifier according to the embodiment.

FIG. 10 shows the configuration of the optical amplifier according to this embodiment. In this optical amplifier, input wavelength multiplexed light is amplified by the EDFs 41a and 41b, and its output level is adjusted by the variable attenuator 42. The gains of the EDFs 41a and 42b are respectively controlled by the AGC circuits 43a and 43b, and a loss in the variable attenuator 42 is controlled by the ALC circuit 44.

The gain of the EDF 41a is controlled based on the input power and the output power of the EDF 41a. Here, the input power of the EDF 41a is detected by a photodiode (PD) 51a, and its output power is detected by a photodiode (PD) 52a.

An amplifier 53a obtains the ratio of the input power to the output power. However, as is well known, ASE (Amplified Spontaneous Emission) is generated in the amplification using an EDF. That is, if the input power of the EDF is assumed to be "Pin", its output power results in "GPin+Pase", where "G" represents the gain of the EDF, and "Pase" represents the power of ASE light. Accordingly, if the gain of the EDF is calculated based on the detected input and output powers, the following value is obtained undesirably.

calculated gain value=output power/input power

=(Gpin+Pase)/Pin

=G+Pase/Pin

=G+Pase/mPinch where "m" represents the number of wavelengths (the number of channels) of wavelength multiplexed light, and "Pinch" represents the input power per channel. Namely, if attempts are made to calculate the gain by using only the input/output powers detected by the photodiodes, an error derived from the ASE occurs. The error is dependent on the number of wavelengths of wavelength multiplexed light.

Accordingly, in this embodiment, an ASE correction value-1 is added by an adder 54a to the value of the input power detected by the photodiode 51a. Here, the ASE correction value-1 corresponds to a value obtained by dividing the power of the ASE light output from the EDF 41a by the gain of the EDF 41a, and is given, for example, by NFhvΔf, where "NF(=2nsp)" represents a noise figure, "hv" represents energy, and "Δf" represents a bandwidth of amplifier. Since "NF" is dependent on the input power per channel, it may be set based on the input power. The ASE correction value-1 is determined in this way, thereby eliminating the influence exerted by the error that is derived from the ASE and is dependent on the number of wavelengths.

An amplifier 55a drives a pump light source (LD) 56a based on a difference between the calculated value of the gain output from the amplifier 53a and a predetermined gain G1.

As described above, in the AGC circuit 43a, the ASE correction value-1 is added to the value of the input power detected by the photodiode 51a. Accordingly, the gain of the EDF 41a can be correctly detected, so that the gain of the EDF 41a can be accurately controlled by using the result of the detection. Additionally, if the input light to the EDF 41a is suspended, the AGC circuit 43a operates as if the light corresponding to the ASE correction value 1 were input to the EDF 41a. Accordingly, the state where "0" is input to the AGC circuit 43a is avoided, and the control system becomes stable.

Configuration and operations of the AGC circuit 43b that controls the gain of the EDF 41b are fundamentally the same as those of the AGC circuit 43a. Therefore, their explanations are omitted.

As stated earlier, the response time of the AGC circuit 43a or 43b (the time constant of the AGC) is sufficiently short in comparison with the response time of the EDF 41a or 41b. This is implemented, for example, by improving the speeds of the amplifiers 53a or 53b, and 55a or 55b.

The ALC circuit 44 controls a loss in the variable attenuator 42 so that the output power of the optical amplifier matches a set value corresponding to the number of wavelengths of wavelength multiplexed light. Here, the output power of the optical amplifier is detected by a photodiode (PD) 52b. Besides, the number of wavelengths of wavelength multiplexed light is notified by the above described supervisory control signal. Notice that, however, the set value corresponding to the number of wavelengths of wavelength multiplexed light is corrected with an ASE correction value-3. The ASE correction value-3 may be determined according to the method recited, for example, by Japanese Patent Publication No. 2000-232433. Then, the variable attenuator 42 is controlled according to the output of the ALC circuit 44. Here, a switching circuit 57 selects the output of the ALC circuit 44 while the optical amplifier operates in the ALC mode.

The response time of the ALC circuit 44 (the time constant of the ALC) is longer than the amount of time required to transmit the supervisory control signal to each optical node as described above.

The optical amplifier according to this embodiment further comprises an ALC auxiliary circuit 60. Here, the ALC auxiliary circuit 60 comprises amplifiers 61 and 63, and a sample/hold circuit 62. The amplifier 61 obtains a loss in the variable attenuator 42 based on the input and the output powers of the variable attenuator 42. The input power of the variable attenuator 42 is detected by a photodiode 52a, and its output power is detected by a photodiode 51b. The sample/hold circuit 62 samples the output of the amplifier 61 at predetermined time intervals. The amplifier 63 outputs difference data for making the loss in the variable attenuator 42, which is obtained by the amplifier 61, match the loss value held by the sample/hold circuit 62.

The ALC auxiliary circuit 60 performs the above described sampling while the optical amplifier operates in the ALC mode. However, in the ALC mode, the switching circuit 57 selects the output of the ALC circuit 44. In the meantime, if the operation of the optical amplifier switches from the ALC mode to the AGC mode, the ALC auxiliary circuit 60 suspends the above described sampling operation, and the sample/hold circuit 62 holds the data obtained by the most recent sampling. Then, in the AGC mode, the control system operates so that the loss in the variable attenuator 42 matches the loss value held in the sample/hold circuit 62. In the AGC mode, the switching circuit 57 selects the output of the ALC auxiliary circuit 60. When the optical amplifier switches back from the AGC mode to the ALC mode, a loss in the variable attenuator 42 is controlled by the ALC circuit 44. Then, the ALC auxiliary circuit 60 again performs the above described sampling. Switching of the operation mode of the optical amplifier will be described in detail later.

Figure 11:
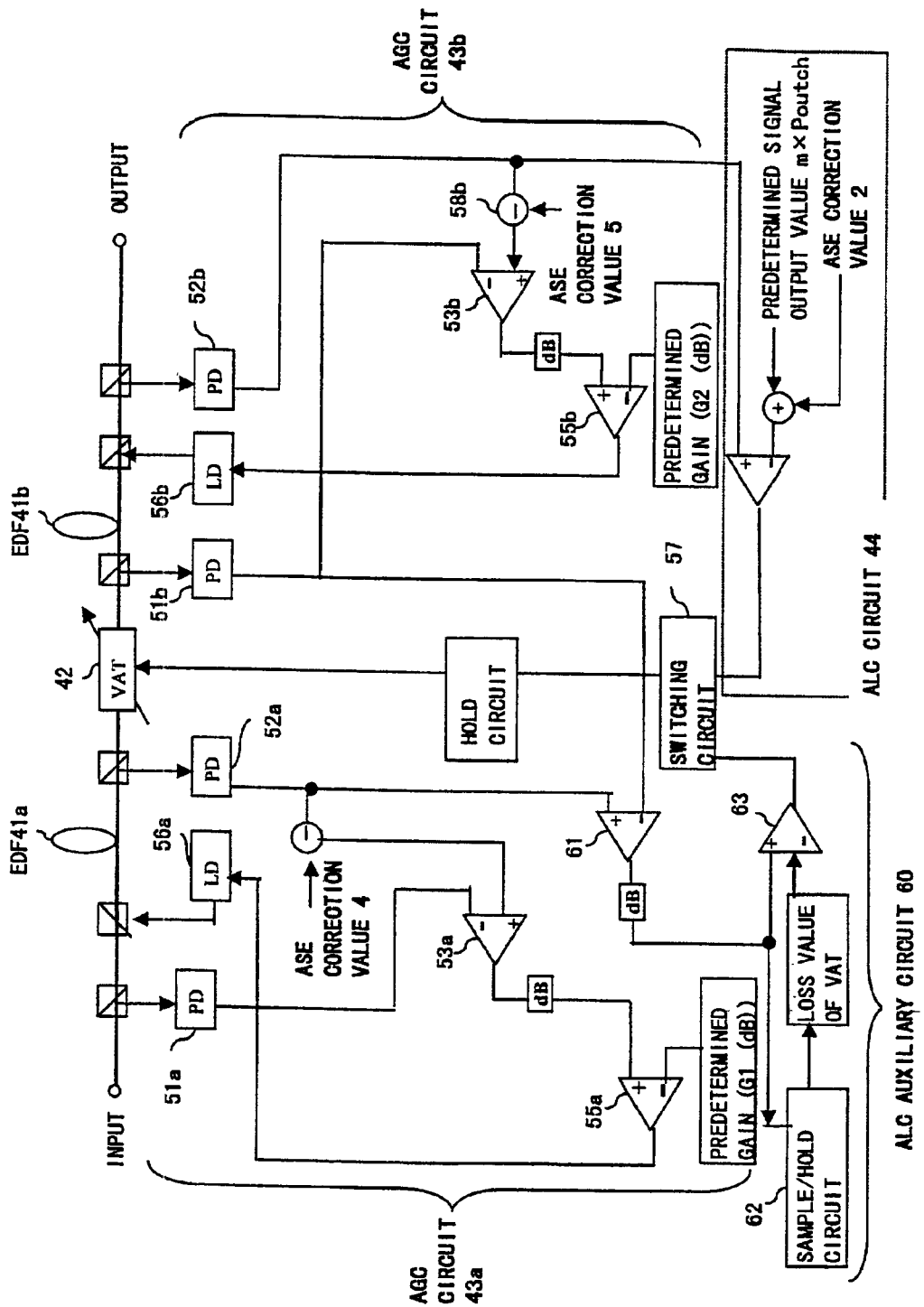
FIG. 11 exemplifies a modification of the optical amplifier shown in FIG. 10.

FIG. 11 exemplifies a modification of the optical amplifier shown in FIG. 10. The fundamental configuration of the optical amplifier shown in FIG. 11 is the same as that shown in FIG. 10. However, a difference exists in a method correcting ASE light in the AGC circuit. Namely, the optical amplifier shown in FIG. 10 has the configuration where the ASE correction values-1 and the ASE correction values-2 are respectively added to the input power values detected by the photodiodes 51a and 51b in order to eliminate the influence of ASE light. In contrast, the optical amplifier shown in FIG. 11 has a configuration where ASE correction values-4 and ASE correction values-5 are respectively subtracted from the output power values detected by the photodiodes 52a and 52b. Note that the ASE correction values-4 and the ASE correction values-5 respectively correspond to the powers of the ASE lights generated in the EDFs 41a and 41b. The configuration where the ASE correction values-4 and the ASE correction values-5 are subtracted from the output power values is disclosed, for example, by Japanese Patent Application No. 11-112434.

As described above, in the optical amplifier shown in FIG. 10, the power of pump light is controlled to make the calculated gain "G=Pout/(Pin+correction value)" match a reference value. In the meantime, in the optical amplifier shown in FIG. 11, the power of pump light is controlled to make the calculated gain "G=(Pout−correction value)/Pin" match a reference value. Accordingly, these amplifiers are the same in a point that the influence of ASE is eliminated in the AGC. However, in the configuration shown in FIG. 11, "0" is input to the AGC circuit 43a when input light to the EDF is suspended. Accordingly, the configuration shown in FIG. 10 has an advantage in the stability of the control system.

Figure 12:
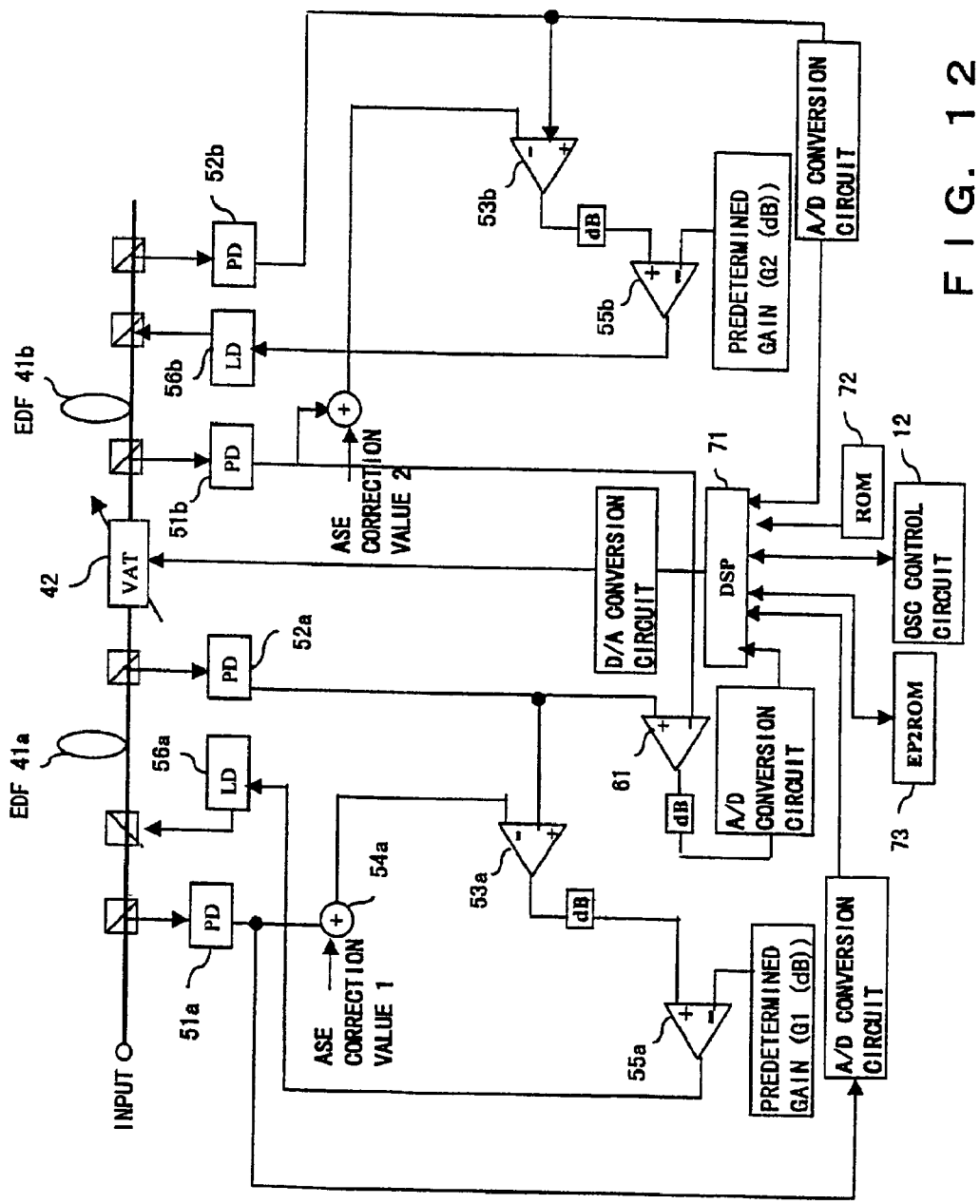
FIG. 12 shows a specific configuration of the optical amplifier according to the embodiment.

FIG. 12 shows a specific configuration of the optical amplifier according to the embodiment. This optical amplifier is based on the configuration shown in FIG. 10.

In this optical amplifier, various controls are performed by a DSP 71. To the DSP 71, digital data representing the input power of the optical amplifier, digital data representing the output power of the optical amplifier, digital data representing a loss in the variable attenuator 42, and control information are provided. Here, the digital data representing the input power of the optical amplifier is obtained by converting an analog value detected by the photodiode 51a into digital data. The digital data representing the output power of the optical amplifier is obtained by converting an analog value detected by the photodiode 52b into digital data. The digital data representing a loss in the variable attenuator 42 is obtained by converting an analog value that represents the ratio of input and output powers respectively detected by the photodiodes 52a and 51b into digital data. The control information includes wavelength number information, operation mode switching information, and ASE correction amount information, and is provided from the control circuit 12. These information items are transmitted to each optical node by the above described supervisory control signal. Additionally, the DSP 71 can access a ROM 72 and an EP2ROM 73. The DSP 71 outputs the information representing a loss in the variable attenuator 42 based on these data and information. The output of the DSP 71 is converted into analog data by a D/A conversion circuit, and provided to the variable attenuator 42.

The DSP 71 mainly executes the following processes.
(1) Giving an instruction to the variable attenuator 42 in the ALC mode.
(2) Detecting a loss in the variable attenuator 42 at predetermined time intervals in the ALC mode, and writing the detected loss value to the EP2ROM 73. Therefore, the EP2ROM 73 is updated with a newly detected loss value whenever necessary.
(3) Suspending the update of the EP2ROM 73 when the operation mode of the optical amplifier switches from the ALC mode to the AGC mode. As a result, data representing a loss in the variable attenuator 42 at the timing when the operation mode switches is stored in the EP2ROM 73. The above described switching of the operation mode occurs, for example, when a change in the number of wavelengths is notified by the supervisory control signal, when an instruction to switch the operation mode is received from the supervisory control signal, when the supervisory control signal cannot be received for a predetermined amount of time, or when a fault occurs in the supervisory controlling unit.
(4) Instructing the variable attenuator 42 of the value stored in the EP2ROM 73 in the AGC mode, when a signal input to the optical amplifier is started.

The above described process (1) is explained in detail. The output power in the ALC mode is fundamentally determined according to the number of wavelengths of wavelength multiplexed light. Here, the number of wavelengths of wavelength multiplexed light is notified by the supervisory control signal as described above. Additionally, target output power to be held in the ALC mode is fundamentally given by a product of "the output power per wavelength" and "the number of wavelengths". "The output power per wavelength" is stored in a ROM 72 in advance.

Figure 13:
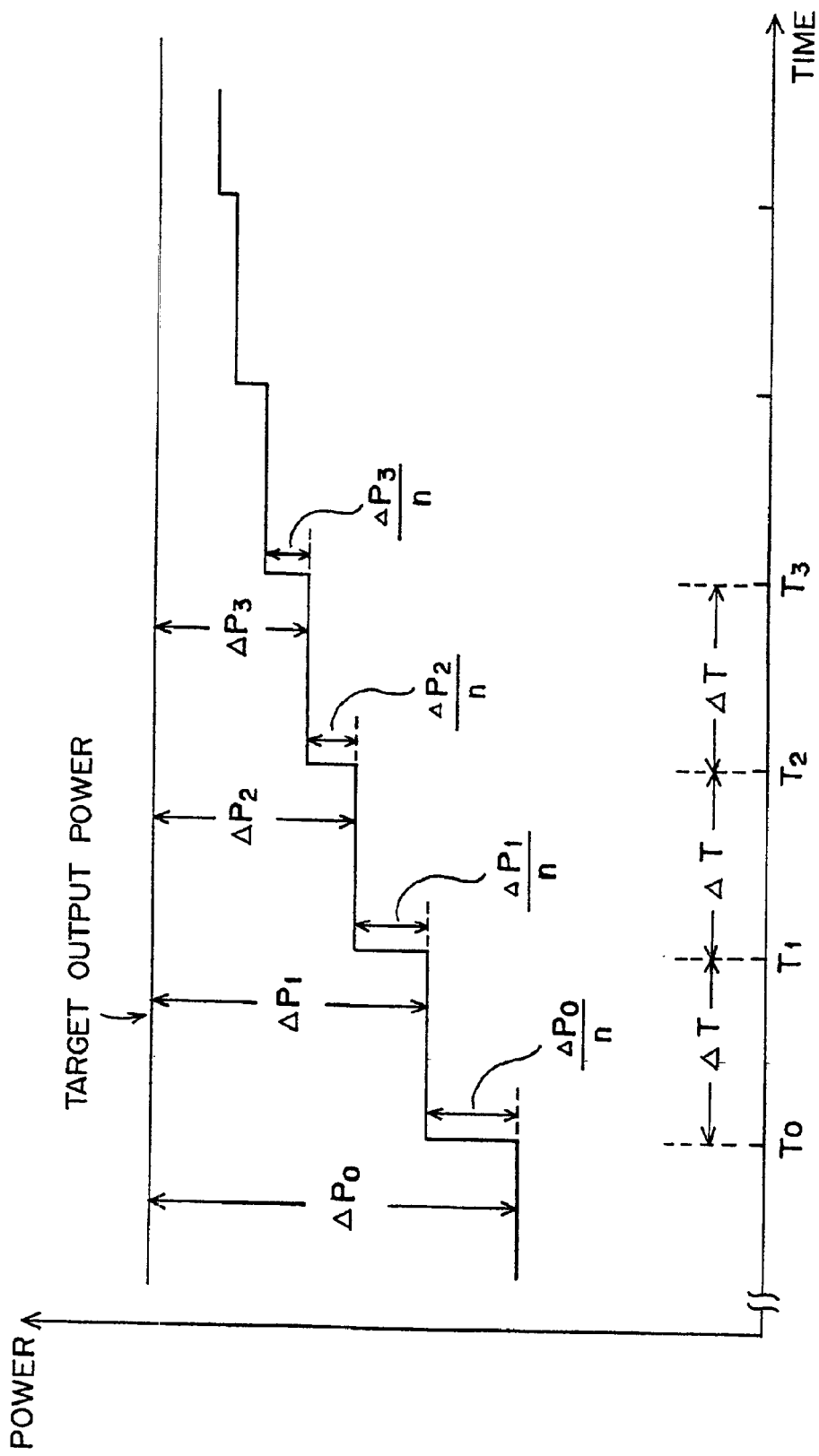
FIG. 13 explains the operations in the ALC mode.

The DSP 71 calculates a difference $\Delta P$ between actual output power detected by the photodiode 52b and target output power, and further calculates a correction amount "$\Delta P/n$", where "n" is a positive value larger than 1. In the example shown in FIG. 13, "$\Delta P_0$" is obtained as the difference between the actual output power and the target output power at a time $T_0$. Accordingly, in this case, the DSP 71 adjusts the loss in the variable attenuator 42 so that the actual output power rises by "$\Delta P_0/n$". Then, "$\Delta P_1$" is obtained as the difference between the actual output power and the target output power at a time $T_1$. Accordingly, in this case, the DSP 71 adjusts the loss in the variable attenuator 42 so that the actual output power rises by "$\Delta P_1/n$". Thereafter, the DSP 71 similarly adjusts a loss in the variable attenuator 42 each time a time $\Delta T$ elapses, and makes the actual output power gradually approach the target output power. The adjustment speed of the output power (namely, the time constant of the ALC) can be set to a desired value by suitably selecting "n" or "$\Delta T$". For example, if "$\Delta T$" is made longer, also the time constant of the ALC becomes longer.

Figure 14:
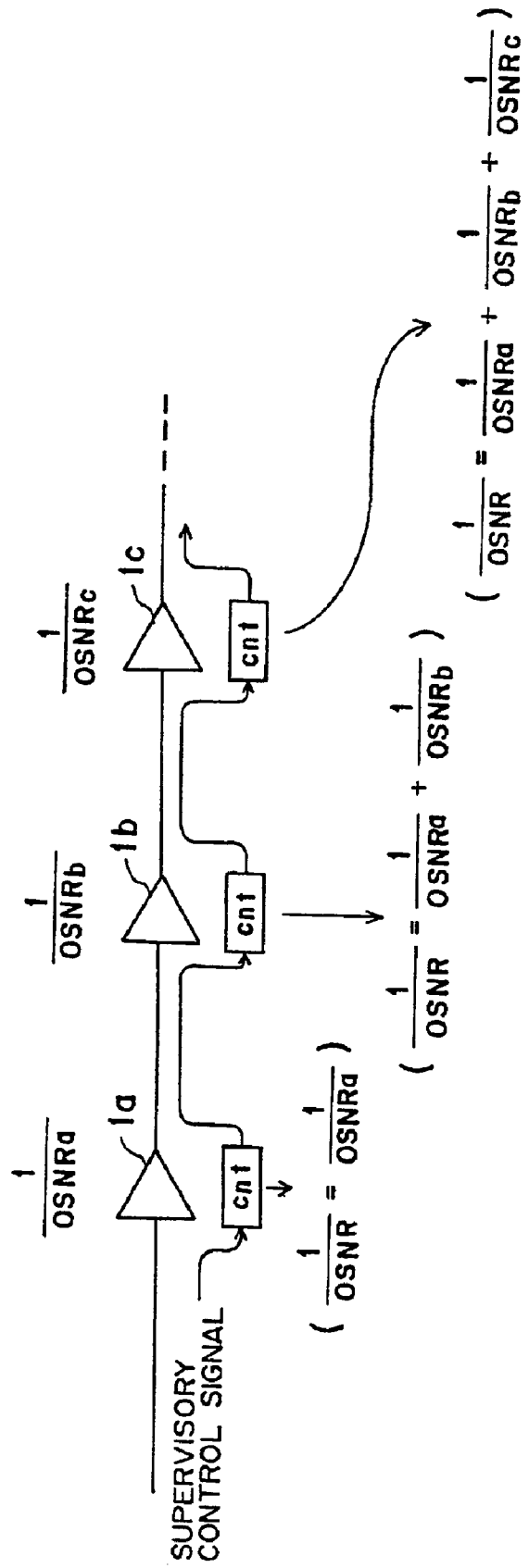
FIG. 14 explains a method determining target output power in the ALC mode.

The target output power is fundamentally determined based on the number of wavelengths of wavelength multiplexed light. However, the target output power maybe determined in consideration of noise. In this case, for instance, noise information transported by the supervisory control signal is used as shown in FIG. 14. That is, each optical amplifier estimates the noise occurring within the local node according to the following equation.

Normalized noise generated in each optical node=10/$OSNRi \times \Delta F$

=$Nfih\nu\Delta F/Pin$ where "OSNRi" represents the ratio of an optical signal to noise in an i-th optical amplifier, "Nfi" represents a noise figure in the i-th optical amplifier and is prestored, for example, in the ROM 72, "hv" represents energy, "ΔF" represents a bandwidth of the optical amplifier, and "Pin" represents input power.

Each optical amplifier adds the information of the noise generated within the local node to noise information notified by the supervisory control signal, and transfers the result of the addition to the next optical node. For instance, in the example shown in FIG. 14, the following results are obtained as the noise information.

optical node 1a: $1/OSNRa \times 10\Delta F$ optical node 1b: $(1/OSNRa+1/OSNRb) \times 10\Delta F$ optical node 1c: $(1/OSNRa+1/OSNRb+1/OSNRc) \times 10\Delta F$ Then, the DSP 71 determines the target output power according to the following equation.

Target output power=$m \times Poutch \times (1+1/OSNR \times 10\Delta F)$ where "m" represents the number of wavelengths of wavelength multiplexed light, "Poutch" represents the output power per wavelength, and "$1/OSNR \times 10\Delta F$" is accumulated noise which is calculated as described above.

Next, the switching of the operation mode of the optical amplifier is described.

FIRST EXAMPLE

An optical amplifier in the first example operates in the ALC mode as fundamental mode, and operates in the AGC mode if the number of wavelengths changes or if a fault occurs.

Figure 15:
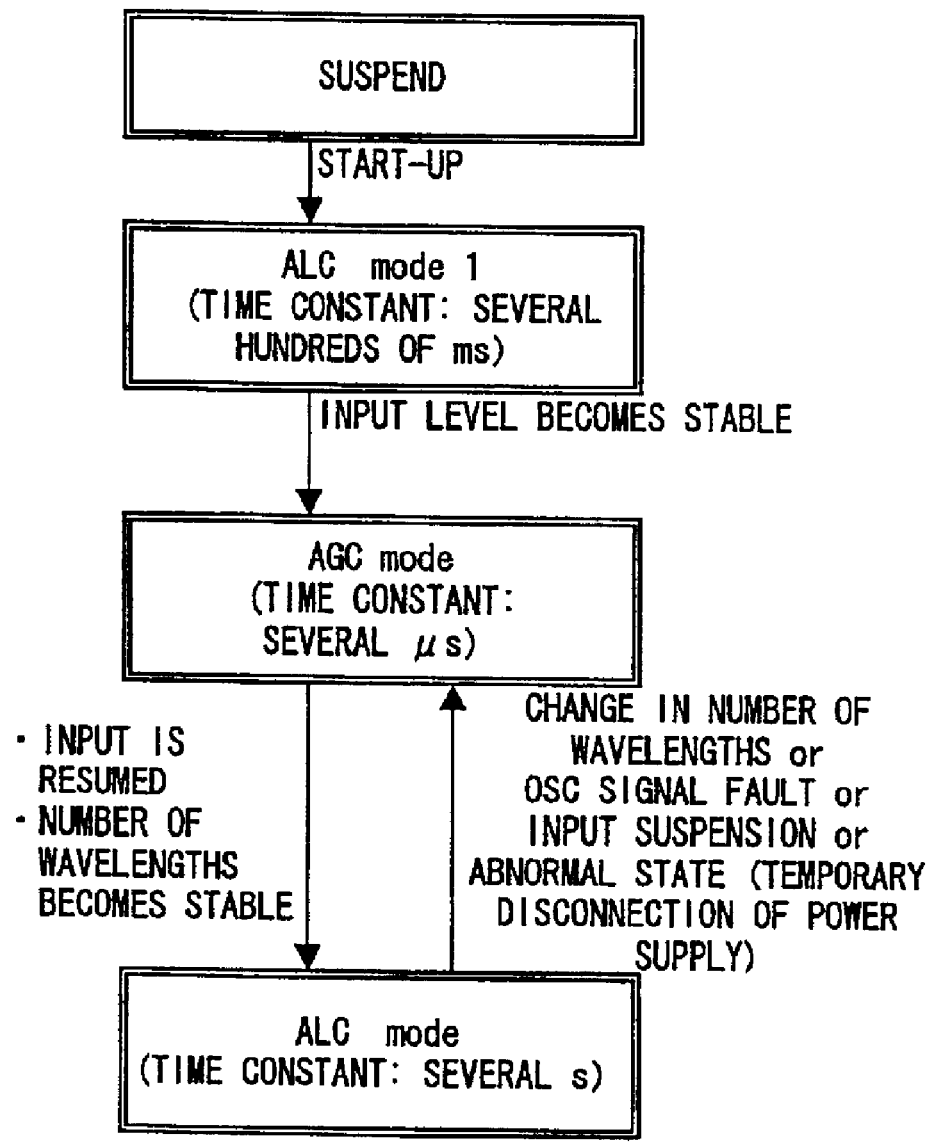
FIG. 15 shows transitions of the operation mode of the optical amplifier in a first example.

FIG. 15 shows transitions of the operation mode of the optical amplifier. The optical amplifier operates in a first ALC mode at its start-up. For the first ALC mode, a relatively short time constant is set. When the input power to the optical amplifier becomes stable in the first ALC mode, the optical amplifier makes a transition to the AGC mode. Note that the input power is detected by the photodiode 51a.

If the number of wavelengths of wavelength multiplexed light is stable in the AGC mode, the optical amplifier makes a transition to a second ALC mode. The number of wavelengths is periodically notified by the supervisory control signal. Accordingly, if the notified number of wavelengths continues to be the same for a predetermined time period, the number of wavelengths is judged to be stable.

For the second ALC mode, a long time constant is set. In the second ALC mode, the optical amplifier makes a transition to the AGC mode (1) when a notification of a change in the number of wavelengths is received, (2) when a fault occurs in the supervisory control signal, (3) when a signal input is suspended, or (4) when a fault (such as temporary disconnection of a power supply, etc.) occurs.

As described above, the optical amplifier according to this example operates, at its start-up, in the first ALC mode whose time constant is relatively short. Accordingly, the output power of the optical amplifier becomes stable within a relatively short time at its start-up.

Figure 16:
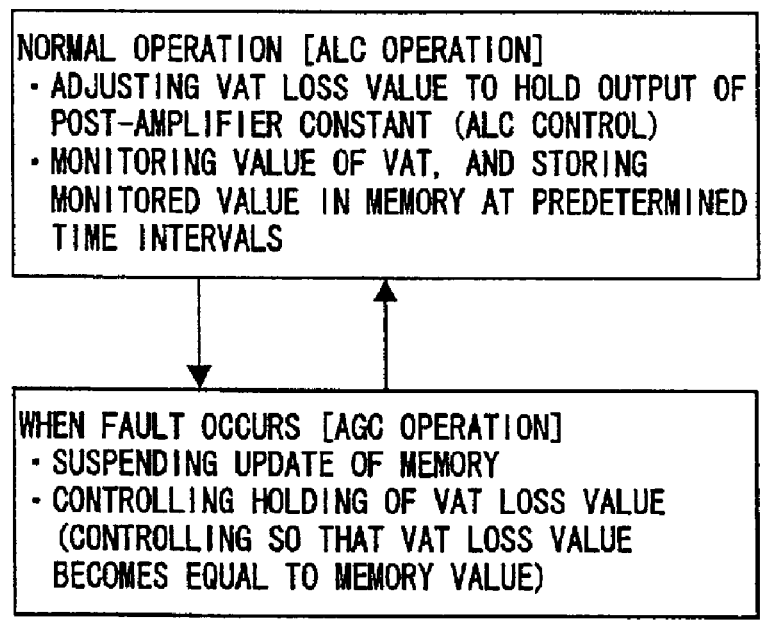
FIG. 16 shows a control flow of the first example.

FIG. 16 shows a control flow of the first example. In the ALC mode, a loss in the variable attenuator 42 is adjusted so that the output power of the optical amplifier (namely, the output power of the EDF 41b) matches target output power. At this time, an actual loss in the variable attenuator 42 is periodically detected, and the most recently detected value is held in the EP2ROM 73.

In the AGC mode, the update of the EP2ROM 73 is suspended. Then, the loss in the variable attenuator 42 is fixed to match the loss value data held in the EP2ROM 73.

Figure 17:
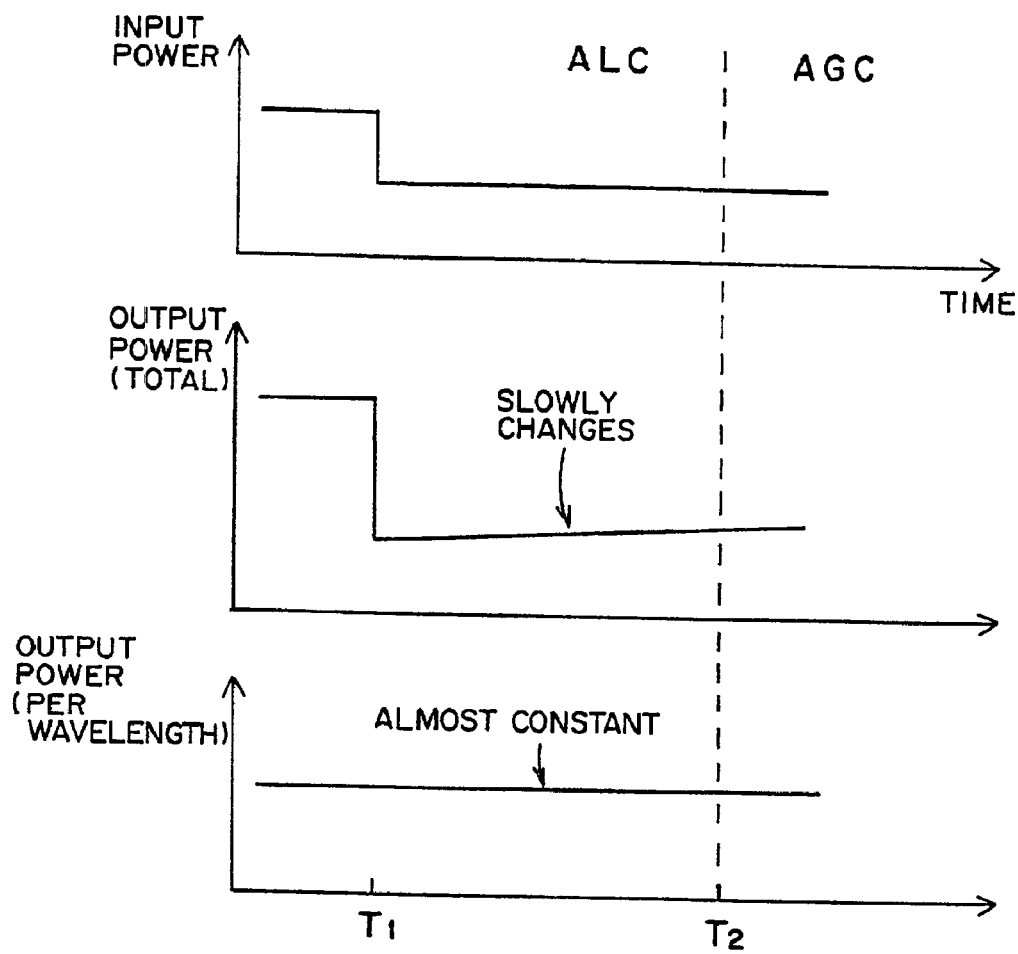
FIG. 17 explains the operations in the ALC mode in the embodiment.

FIG. 17 explains the operations performed when the number of wavelengths of wavelength multiplexed light changes in the ALC mode (corresponding to the second ALC mode shown in FIG. 15). Here, assume that the number of wavelengths of wavelength multiplexed light decreases at a time $T_1$. In this case, the total input power and the total output power of the optical amplifier drop. However, the output power per wavelength does not vary. Hereafter, in the ALC mode, a loss in the variable attenuator 42 is adjusted so that the total output power of the optical amplifier is held to be a constant value. However, because the time constant of the ALC of the optical amplifier according to the embodiment is sufficiently long, the speed at which the total output power of the optical amplifier changes is very slow. Accordingly, the output power per wavelength remains almost constant.

When the change in the number of wavelengths is notified by the supervisory control signal, the operation mode switches from the ALC mode to the AGC mode. Here, a time period (a period between times T1 and T2) from when the number of wavelengths of wavelength multiplexed light changes till when the number of wavelengths is notified by the supervisory control signal is, for example, on the order of several tens of milliseconds. In the meantime, the time constant of the ALC is on the order of several seconds. Accordingly, the loss in the variable attenuator 42 does not almost change in the time period from when the number of wavelengths changes till when the operation mode switches, and also the output power per wavelength does not almost vary.

Figure 18:
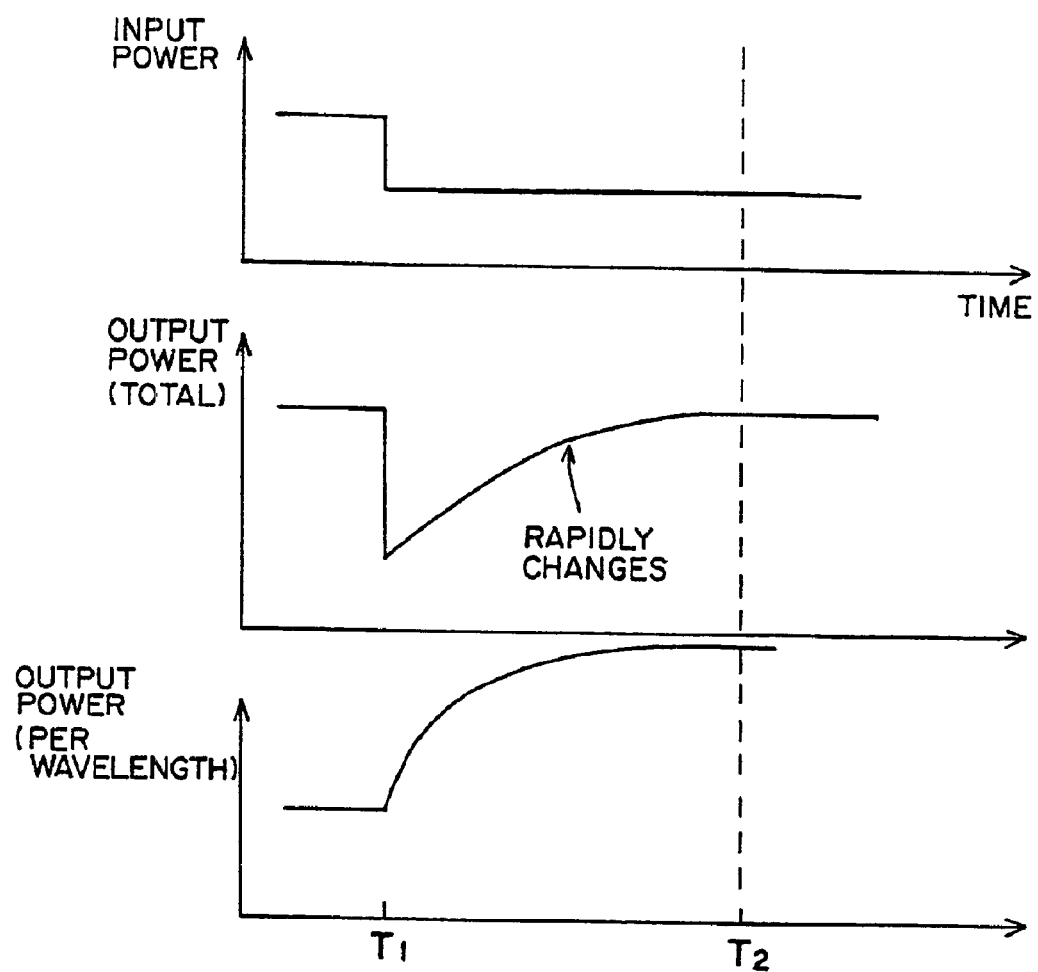
FIG. 18 explains the operations in conventional ALC mode.

Or, suppose that the time constant of the ALC is not sufficiently long. In this case, the output power per wavelength varies in the time period from when the number of wavelengths changes till when the operation mode switches, as shown in FIG. 18. Namely, in the example shown in FIG. 18, when the number of wavelengths of wavelength multiplexed light changes at a time $T_1$, the total output power of the optical amplifier thereafter attempts to revert to the level before the time T1 in a relatively short time thereafter. Accordingly, also the output power per wavelength varies as a result of this ALC operation.

The time constant of the ALC is determined, for example, as follows. Firstly, a tolerable value of a change in the output power per wavelength is determined. Then, the maximum value of the amount of time required to transmit the supervisory control signal to each optical node is estimated based on the configuration of the communications system, the signal processing time (including the 3R operations) at each optical node, etc. The time constant of the ALC is set so that a change in the output power per wavelength does not exceed the above described tolerable value in a time period from when the number of wavelengths changes till when the maximum time estimated as described above elapses.

Furthermore, the characteristics of the optical amplifier vary depending on a change in an ambient temperature, a deterioration of a component configuring the optical amplifier with time, or the like. However, the speed of the variation in the characteristics, which is caused by such factors, is extremely slow. For example, a change on the order of 1 dB occurs during several hours to several years. Accordingly, even if the time constant of the ALC is set to on the order of several seconds to several ten seconds, a change in the output power, which is caused by these factors, can be suppressed.

Turning back to FIG. 17. After the operation mode is switched at the time T2, the optical amplifier operates in the AGC mode. Here, the time constant of the AGC of the optical amplifier according to the embodiment is sufficiently short in comparison with the response time of the EDF. Accordingly, the gain of the optical amplifier is held constant as described with reference to FIG. 8. That is, the output power per wavelength does not vary even if the number of wavelengths of wavelength multiplexed light changes.

Figure 19:
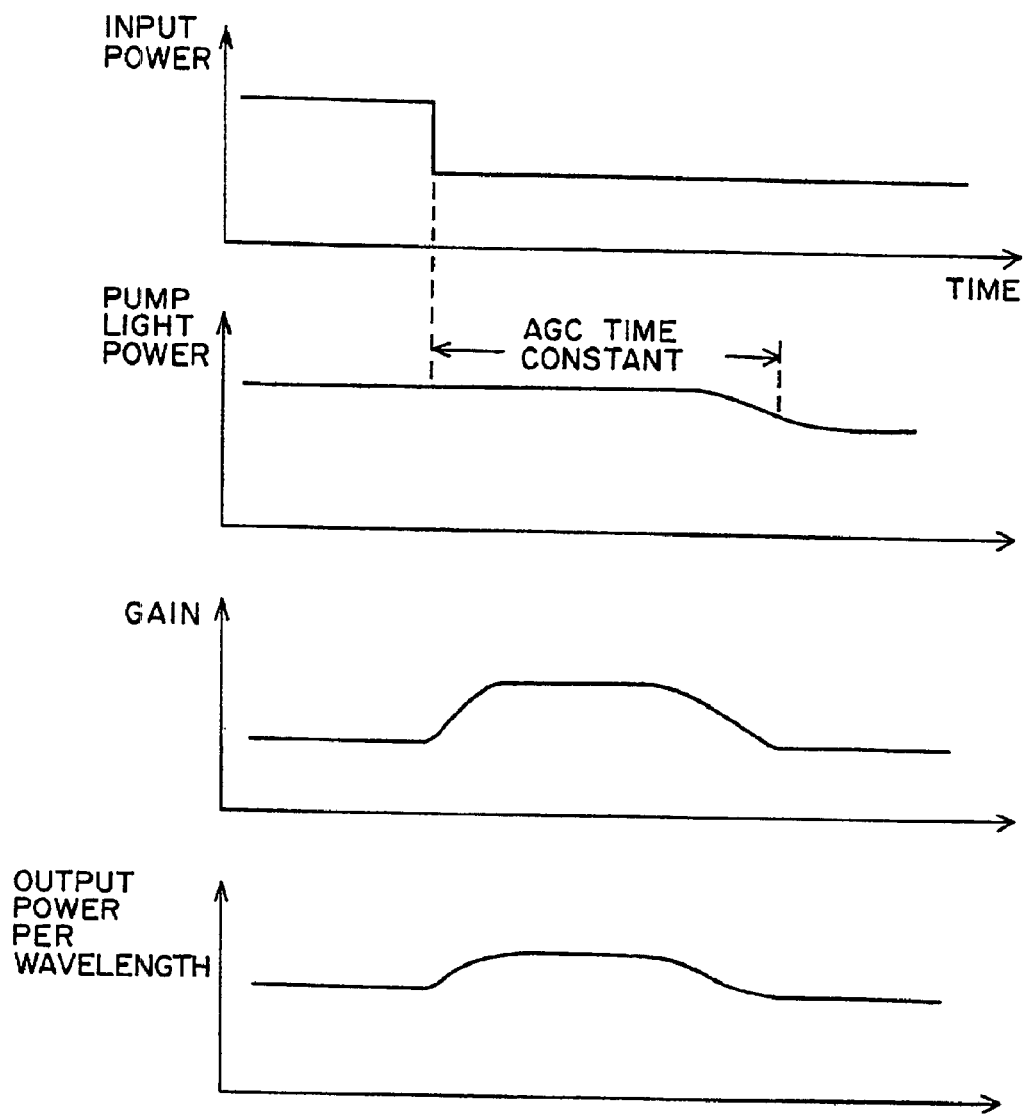
FIG. 19 explains the operations in conventional AGC mode.

In contrast, supposing that the time constant of the AGC is not sufficiently short, the output power per wavelength varies as shown in FIG. 19 when the number of wavelengths of wavelength multiplexed light changes. That is, if the time period from when the input power decreases due to a change in the number of wavelengths till when the power of pump light is suitably adjusted becomes longer than the response time of the EDF, a delay occurs in an adjustment to the power of pump light, so that the gain of the EDF temporarily becomes too large. Consequently, the output power per wavelength temporarily becomes large. Namely, a surge occurs undesirably.

Figure 20:
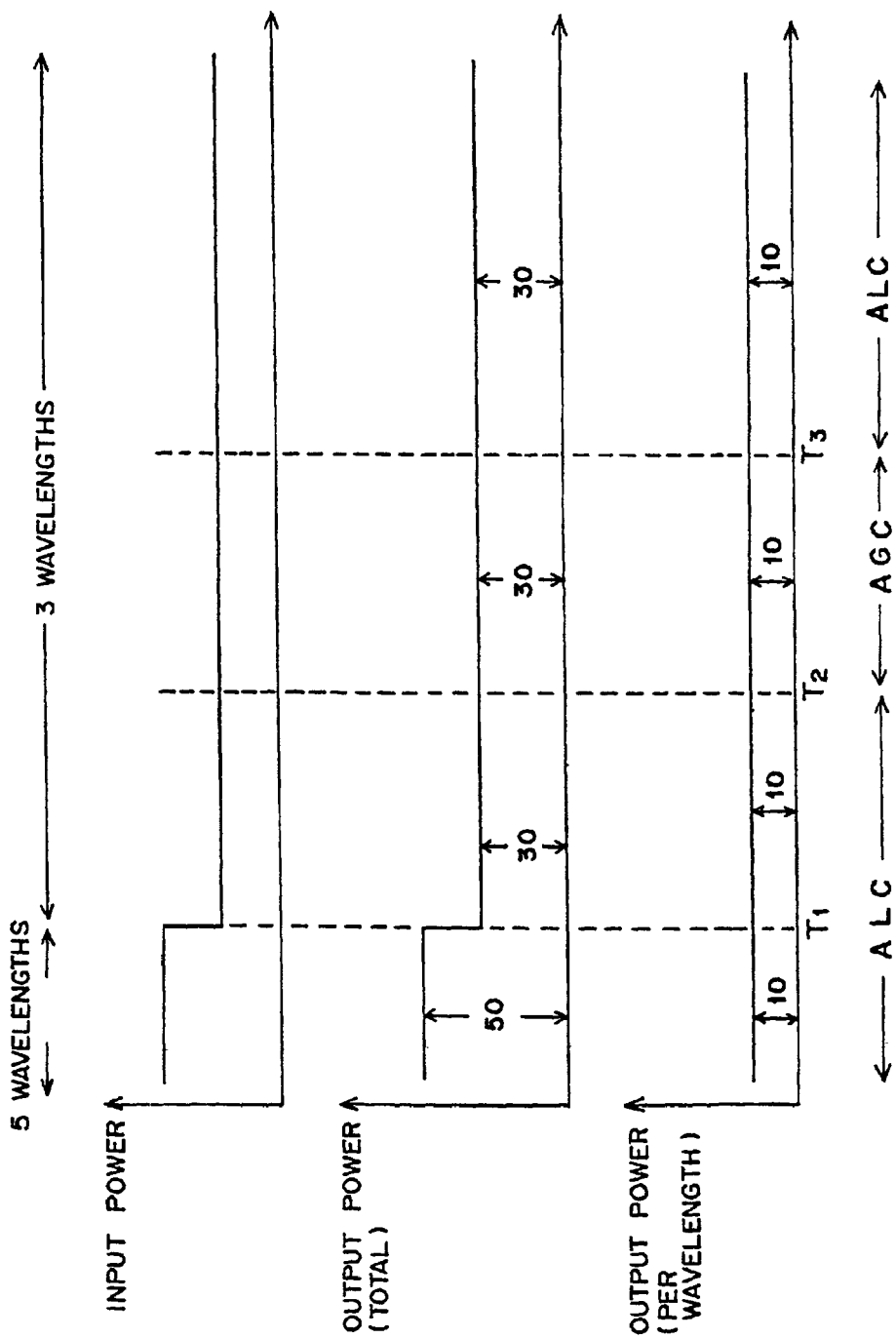
FIG. 20 shows transitions of the operation mode and the output power per wavelength.

FIG. 20 shows transitions of the operation mode and the output power per wavelength, when the number of wavelengths of wavelength multiplexed light changes. Here, assume that the number of wavelengths of wavelength multiplexed light changes from "5" to "3" at a time T1. Also assume that the target output power corresponding to "the number of wavelengths=5" is "50", and that corresponding to "the number of wavelengths=3" is "30" in the ALC mode. It should be remembered that the light powers are represented by numerical values without unit in FIG. 20 for explanation.

Before the time T1, the optical amplifier operates in the ALC mode, and the total output power is held to be "50". At this time, the output power per wavelength is "10".

When the number of wavelengths of wavelength multiplexed light changes from "5" to "3" at the time T1, the total output power of the optical amplifier decreases from "50" to "30". At this time, the optical amplifier operates in the ALC mode. Therefore, the DSP 71 adjusts the variable attenuator 42 to make the total output power of the optical amplifier revert to "50", until receiving the supervisory control signal including wavelength number information at a time T2. However, since the time constant of the ALC of the optical amplifier according to the embodiment is sufficiently long as described above, the total output power of the optical amplifier at the time T2 remains almost at "30". Namely, the output power per wavelength remains almost at "10" during the time period between the times T1 and T2.

At the time T2, the optical amplifier switches from the ALC mode to the AGC mode. Accordingly, the loss value of the variable attenuator 42 at the time T2 is held in the EP2ROM 73 hereafter.

After the time T2, the optical amplifier operates in the AGC mode. Here, a loss in the variable attenuator 42 is pursuant to the value held in the EP2ROM 73. Furthermore, because the gain of the optical amplifier is held constant in the AGC mode, the output power per wavelength does not change. That is, the output power per wavelength remains almost at "10", and the total output power remains almost at "30" for the time period during the optical amplifier operates in the AGC mode.

If the same wavelength number information (the number of wavelengths=3) continues to be detected for a predetermined time period while the optical amplifier operates in the AGC mode, the operation mode switches back from the AGC mode to the ALC mode at the time T3. At this time, the target output power is set to "30" according to the received wavelength number information. In the meantime, the total output power is held to be almost "30" while the optical amplifier operates in the AGC mode. Namely, the actual total output power of the optical amplifier almost matches the target output power at the time T3. Accordingly, the loss value of the variable attenuator 42 is not significantly adjusted at and after the time T3. Therefore, the output power per wavelength remains almost at "10" also after the time T3.

As described above, the output power of each signal light included in wavelength multiplexed light output from the optical amplifier is held to be almost a constant even if the number of wavelengths of the wavelength multiplexed light changes. That is, the time constant of the AGC is made sufficiently short, and that of the ALC is made sufficiently long, whereby the output power of each signal light included in the wavelength multiplexed light output from the optical amplifier is continuously stable.

SECOND EXAMPLE

An optical amplifier in the second example operates in the AGC mode as fundamental mode, and periodically operates in the ALC mode.

Figure 21:
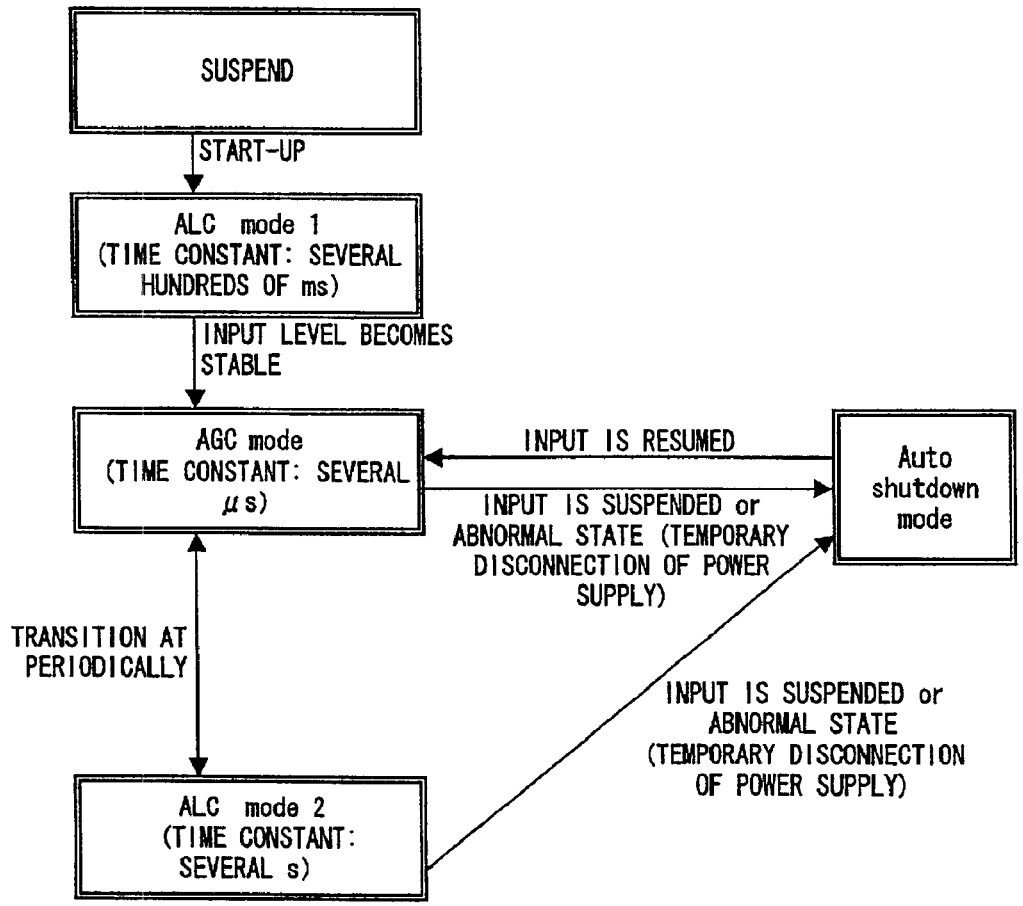
FIG. 21 shows transitions of the operation mode of an optical amplifier in a second example.

FIG. 21 shows transitions of the operation mode of the optical amplifier. The procedures from when the optical amplifier is started up till when the operation mode makes a transition to the AGC mode via the first ALC mode are the same as those in the first example.

In the AGC mode, a loss in the variable attenuator 42 is fixed to a value held in the EP2ROM 73. The ALC mode is started up periodically or according to an external instruction, etc. In the ALC mode, a loss in the variable attenuator 32 is adjusted so that the output power of the optical amplifier matches target output power. Accompanying this adjustment, the EP2ROM 73 is updated. Therefore, the loss in the variable attenuator 42 is suitably adjusted when the optical amplifier switches back to the AGC mode.

As described above, a loss in the variable attenuator 42 is suitably adjusted, so that the output power is stable even while the optical amplifier operates in the AGC mode.

THIRD EXAMPLE

An optical amplifier in the third example operates in the ALC mode as fundamental mode in a similar manner as in the first example. However, the optical amplifier in the third example has shutdown mode in addition to the first ALC mode, the second ALC mode, and the AGC mode in the first example.

Figure 22:
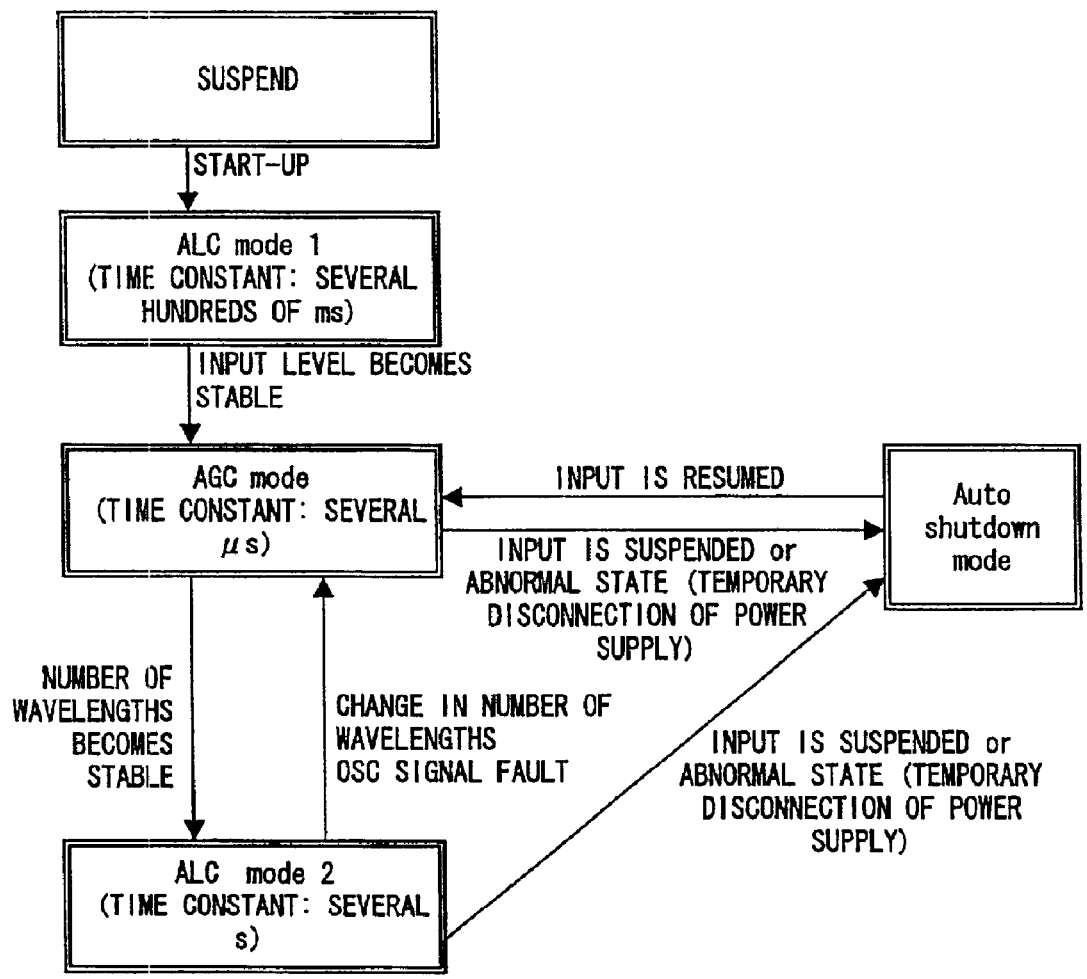
FIG. 22 shows transitions of the operation mode of an optical amplifier in a third example.

FIG. 22 shows transitions of the operation mode of the optical amplifier. Here, since the first ALC mode, the second ALC mode, and the AGC mode are fundamentally the same as those in the first example, their explanations are omitted.

In the third example, in the AGC mode or the second ALC mode, the optical amplifier makes a transition to the shutdown mode (1) when a signal input is suspended, or (2) when a fault (such as temporary disconnection of a power supply, etc.) occurs. In the shutdown mode, the optical amplifier makes a transition to the AGC mode when a signal input is resumed.

Figure 23:
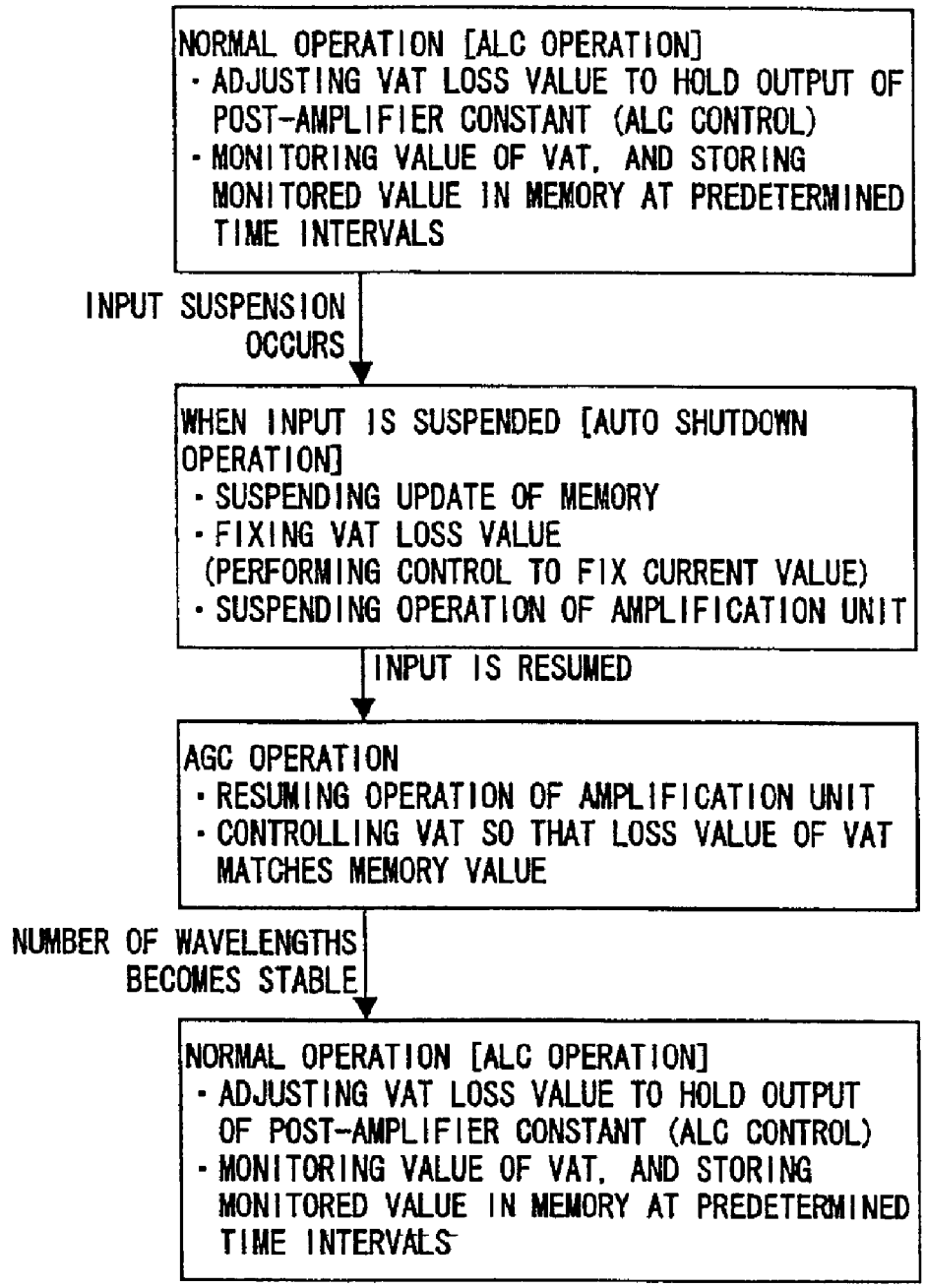
FIG. 23 shows a control flow of the third example.

FIG. 23 shows a control flow of the third example. In the ALC mode, a loss in the variable attenuator 42 is adjusted so that the output power of the optical amplifier matches target output power. At this time, an actual loss in the variable attenuator 42 is periodically detected, and the most recently detected value is held in the EP2ROM 73. When an input signal is suspended, the optical amplifier makes a transition to the shutdown mode.

In the shutdown mode, an update of the EP2ROM 73 is suspended. Furthermore, the amplification operation performed by the EDF is suspended. Namely, the driving of the pump light source is suspended. When a signal input is resumed, the optical amplifier makes a transition to the AGC mode.

In the AGC mode, the pump light source is driven. Additionally, a loss in the variable attenuator 42 is fixed to match the loss value data held in the EP2ROM 73. Then, the optical amplifier makes a transition to the ALC mode when a predetermined amount of time elapses or when the number of wavelengths of wavelength multiplexed light becomes stable.

As described above, when the signal input is suspended, the optical amplifier makes a transition to the shutdown mode, and the amplification operation is suspended in the third example. Therefore, even in the configuration shown in FIG. 11, "0" is never input to the AGC circuit. Accordingly, the operations of the AGC circuit can be prevented from becoming unstable.

FOURTH EXAMPLE

Figure 24:
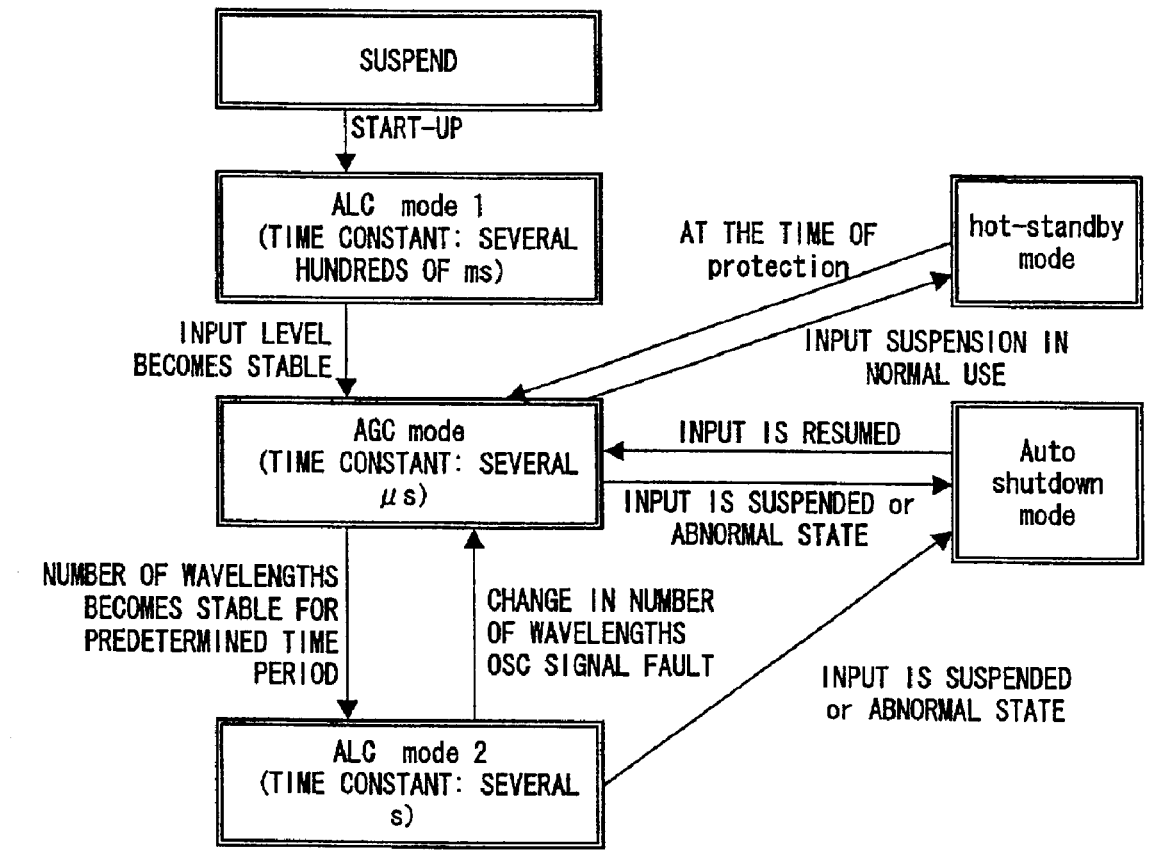
FIG. 24 shows transitions of the operation mode of an optical amplifier in a fourth example.

An optical amplifier in the fourth example has hot-standby mode as shown in FIG. 24.

Within the communications system according to the embodiment, many optical amplifiers exist. To some of them, however, wavelength multiplexed light is sometimes input not when the communications system is in normal use but only when the system executes the protection function. In this case, these optical amplifiers are set to the standby mode if the communications system is in normal use. Here, in the standby mode, pump light the power of which is smaller than that in the case where normal amplification operation is performed is supplied to the EDF. Namely, in the standby mode, the EDF is in the state of being pumped at low level. When wavelength multiplexed light is input to the optical amplifiers that operates in the standby mode, its operation mode immediately makes a transition to the AGC mode. Since the EDF is already pumped to some degree at this time, the amount of time required to start the amplification operation in the AGC mode is short.

Figure 25:
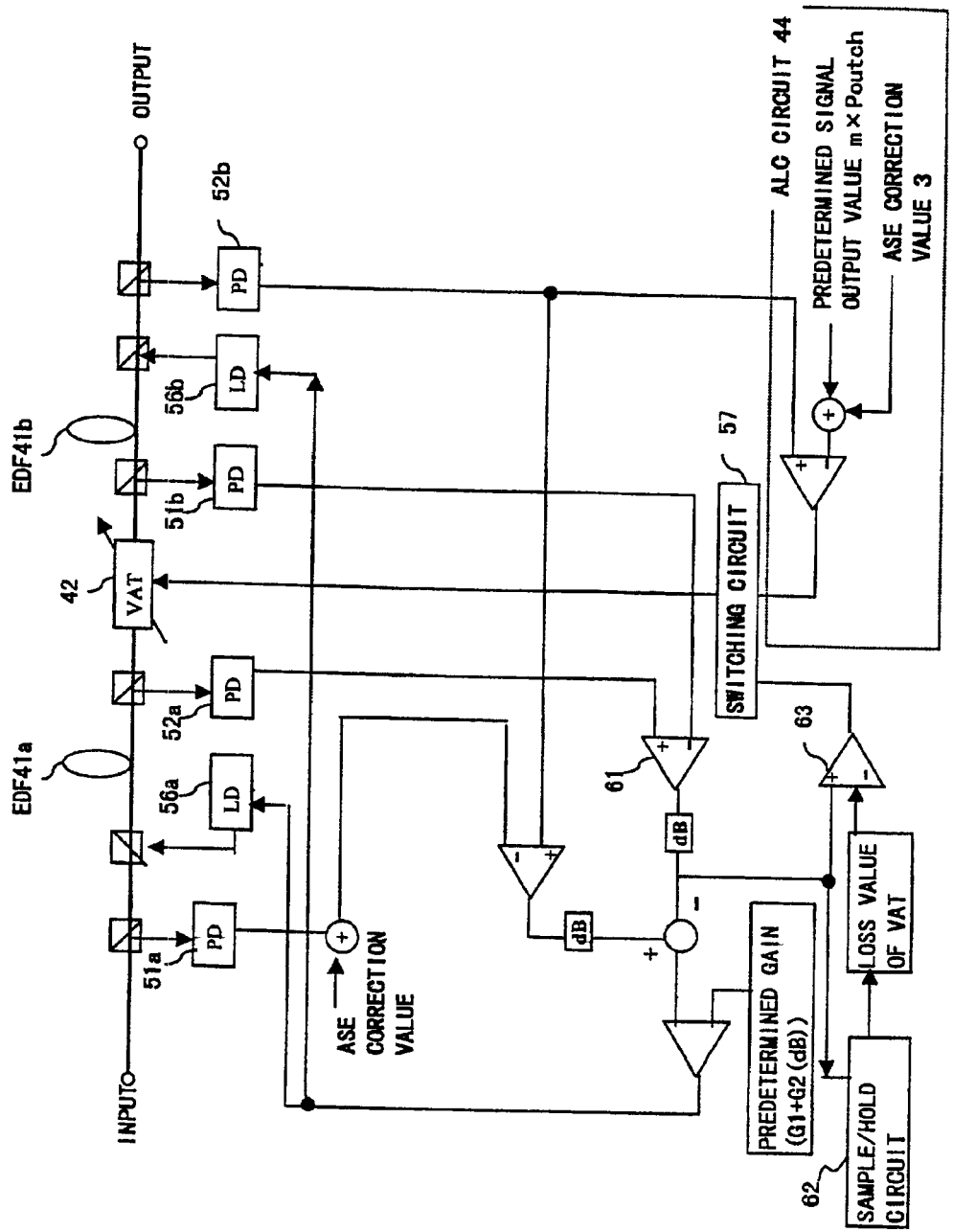
FIG. 25 shows the configuration of an optical amplifier according to another embodiment.

In the optical amplifier according to the above described embodiments, the gains of the EDFs 41a and 41b are individually controlled. However, the present invention is not limited to this configuration. That is, as shown in FIG. 25, a sum of the gains of the EDFs 41a and 41b may be controlled to be constant. In this case, the sum of the gains of the EDFs 41a and 41b is obtained by subtracting a loss in the variable attenuator 42 from the gain of the entire optical amplifier. Then, the pump light sources 56a and 56b are controlled so that the sum of the gains of the EDFs 41a and 41b becomes a predetermined target value. With such a configuration, a tilt of a gain does not occur, and a high output is not required at a pre-stage amplification unit (namely, the EDF 41a).

Additionally, in the above described embodiments, a pair of optical amplifiers implemented by erbium-doped fibers is arranged. However, linear optical amplifiers may be used instead. The linear optical amplifier is a semiconductor amplifier in which laser oscillation is made in the direction perpendicular to a resonator, and a gain of which is clamped. Therefore, a gain to a signal is held to be a constant value regardless of an input level. In this case, the need for the AGC circuit can be eliminated, or the configuration of the AGC circuit can be simplified.

Figure 26A:
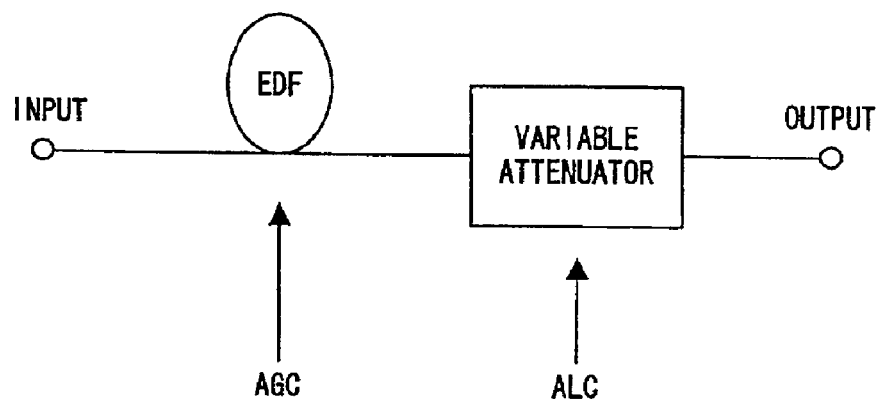
FIGS. 26A and 26B show the fundamental configurations of an optical amplifier according to further embodiments.
Figure 26B:
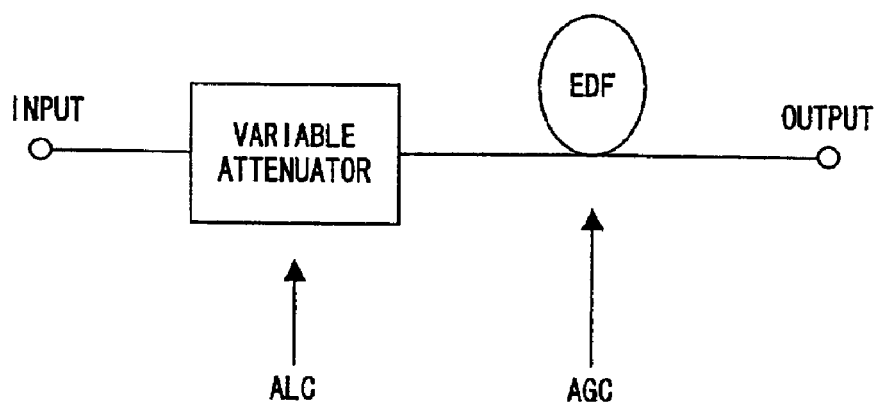

Furthermore, the optical amplifier according to the above described embodiments is configured to include an pre-stage amplification unit, a post-stage amplification unit, and a variable attenuator arranged in between. However, the present invention is not limited to this configuration. Namely, the present invention is also applied to an optical amplifier that is configured by one amplification unit as shown in FIG. 26A or 26B.

According to the present invention, in an optical amplifier amplifying wavelength multiplexed light, the output power of each signal light included in the wavelength multiplexed light becomes stable. Especially, even if the number of wavelengths of wavelength multiplexed light changes, the output power of each signal light is held to be constant.

What is claimed is:

1. An optical amplifier, which has an optical amplification medium and an optical attenuator, used in an optical communications system transmitting wavelength multiplexed light with a plurality of optical amplifiers, comprising:
a gain controlling circuit holding a gain of the optical amplification medium to be a constant value; and
a level controlling circuit controlling a loss in the optical attenuator so that an output level of the optical amplifier is held to be a value corresponding to a control signal notified to the plurality of optical amplifiers within the optical communications system, wherein
a time constant of said level controlling circuit, which is a time period from when the output level of the optical amplifier changes until when the loss in the optical attenuator is adjusted to make the output level of the optical amplifier revert to a designated level, is longer than a time period required for transmitting the control signal from a supervisory controlling unit which generates the control signal via the optical communications system to the plurality of the optical amplifiers within the optical communications system.

2. The optical amplifier according to claim 1, wherein the time constant of the gain controlling circuit is shorter than a response time of the optical amplification medium.

3. The optical amplifier according to claim 1, wherein:
said gain controlling circuit comprises
a detecting unit detecting input power and output power of the optical amplification medium,
a calculating unit calculating the gain of the optical amplification medium based on the input power and the output power, which are detected by said detecting unit, and
a pump light controlling unit controlling power of pump light to be supplied to the optical amplification medium according to the gain calculated by said calculating unit; and
said calculating unit calculates the gain of the optical amplification medium based on a ratio of the input power to a value obtained by subtracting power of amplified spontaneous emission noise generated in the optical amplification medium from the output power.

4. The optical amplifier according to claim 1, wherein
said level controlling circuit fixes a loss in the optical attenuator when a change in a number of wavelengths of wavelength multiplexed light is notified by the control signal.

5. The optical amplifier according to claim 4, wherein
said level controlling circuit switches back to an operation mode in which the loss in the optical attenuator is controlled to hold the output level of the optical amplifier to be a constant value, if the number of wavelengths of wavelength multiplexed light becomes stable while the loss in the optical attenuator is fixed.

6. The optical amplifier according to claim 1, wherein said level controlling circuit fixes the loss in the optical attenuator if the control signal is not received for a predetermined time period.

7. The optical amplifier according to claim 1, wherein said gain controlling circuit suspends an amplification operation of the optical amplification medium if wavelength multiplexed light is not input to the optical amplifier.

8. The optical amplifier according to claim 1, wherein said level controlling circuit operates with a first time constant when the optical amplifier is started up, and therafter, operates with a second time constant that is longer than the first time constant and also longer than a time period required to notify the control signal to the plurality of optical amplifiers within the optical communications systems.

9. The optical amplifier according to claim 1, wherein said level controlling circuit controls the loss in the optical attenuator so that the output level of the optical amplifier is held to be a value that is determined in consideration of noise accumulated while wavelength multiplexed light is being transmitted to the optical amplifier.

10. The optical amplifier according to claim 1, wherein:
the optical amplification medium comprises a first optical amplification media and a second optical amplification media; and
said gain controlling circuit holds a sum of gains of the first and the second optical amplification media to be a constant value.

11. A WDM communications system, which includes a plurality of optical nodes connected in a form of a ring, wherein
each of the plurality of optical nodes comprise the optical amplifier according to claim 1.

12. An optical communications system in which a plurality of optical amplifiers are arranged on a transmission line for transmitting wavelength multiplexed light, wherein
each of the plurality of optical amplifiers is the optical amplifier according to claim 1.

13. An optical amplifier, used in an optical communications system transmitting wavelength multiplexed light with a plurality of optical amplifiers, comprising:
an optical amplification medium amplifying input wavelength multiplexed light with a constant gain without being dependent on an input level;
an optical attenuator arranged at a stage preceding or succeeding the optical amplification medium; and
a level controlling circuit controlling a loss in the optical attenuator so that an output level of the optical amplifier is held to be a value corresponding to a control signal that is notified to the plurality of optical amplifiers within the optical communications system, wherein
a time constant of said level controlling circuit, which is a time period from when the output level of the optical amplifier changes until when the loss in the optical attenuator is adjusted to make the output level of the optical amplifier revert to a designated level, is longer than a time period required for transmitting the control signal from a supervisory controlling unit which generates the control signal via the optical communications system to the plurality of the optical amplifiers within the optical communications system.

14. An optical amplifier, which has an optical amplification medium and an optical attenuator, used in an optical communications system transmitting wavelength multiplexed light with a plurality of optical amplifiers, comprising:
gain controlling means holding a gain of the optical amplification medium to be a constant value; and
level controlling means controlling a loss in the optical attenuator so that an output level of the optical amplifier is held to be a value corresponding to a control signal notified to the plurality of optical amplifiers within the optical communications system, wherein
a time constant of said level controlling means, which is a time period from when the output level of the optical amplifier changes until when the loss in the optical attenuator is adjusted to make the output level of the optical amplifier revert to a designated level, is longer than a time period required for transmitting the control signal from a supervisory controlling unit which generates the control signal via the optical communications system to the plurality of the optical amplifiers within the optical communications system.

15. An optical amplifier, used in an optical communications system transmitting wavelength multiplexed light with a plurality of optical amplifiers, comprising:
optical amplification means amplifying input wavelength multiplexed light with a constant gain without being dependent on an input level;
optical attenuator means arranged at a stage preceding or succeeding the optical amplification means; and
level controlling means controlling a loss in the optical attenuator means so that an output level of the optical amplifier is held to be a value corresponding to a control signal that is notified to the plurality of optical amplifiers within the optical communications system, wherein
a time constant of said level controlling means, which is a time period from when the output level of the optical amplifier changes until when the loss in the optical attenuator means is adjusted to make the output level of the optical amplifier revert to a designated level, is longer than a time period required for transmitting the control signal from a supervisory controlling unit which generates the control signal via the optical communications system to the plurality of the optical amplifiers within the optical communications system.

16. An optical amplifier, which has an optical amplification medium and an optical attenuator, for amplifying wavelength multiplexed light, comprising
a gain controlling circuit holding a gain of the optical amplification medium to be a constant value, and
a level controlling circuit controlling a loss in the optical attenuator so that an output level of the optical amplifier is held to be a constant value, wherein:
said gain controlling circuit comprises
a detecting unit detecting input power and output power of the optical amplification medium,
a calculating unit calculating the gain of the optical amplification medium based on the input power and the output power, which are detected by said detecting unit;

a correction value generating unit generating an Amplified Spontaneous Emission (ASE) correction value, which is an equivalent value at the input of the optical amplification medium for the amplified spontaneous emission noise generated in the optical amplification medium, a pump light controlling unit controlling pump light power to be supplied to the optical amplification medium according to the gain calculated by said calculating unit; and said calculating unit calculates the gain of the optical amplification medium based on a ratio of a value obtained by adding the ASE correction value generated by said correction value generating unit to the input power, to the output power.

17. An optical amplifier, which has an optical amplification medium and an optical attenuator, for amplifying wavelength multiplexed light, comprising gain controlling means holding a gain of the optical amplification medium to be a constant value, and level controlling means controlling a loss in the optical attenuator so that an output level of the optical amplifier is held to be a constant value, wherein:

said gain controlling means comprises detecting means detecting input power and output power of the optical amplification medium, calculating means calculating the gain of the optical amplification medium based on the input power and the output power, which are detected by said detecting means, correction value generating means generating an Amplified Spontaneous Emission (ASE) correction value, which is equivalent value at the input of the optical amplification medium for the amplified spontaneous emission noise generated in the optical amplification medium, pump light controlling means controlling power of pump light to be supplied to the optical amplification medium according to the gain calculated by said calculating means; and said calculating means calculates the gain of the optical amplification medium based on a ratio of a value obtained by adding the ASE correction value generated by said correction value generating means to the input power, to the output power.

* * * * *

UNITED STATES PATENT AND TRADEMARK OFFICE
CERTIFICATE OF CORRECTION

PATENT NO. : 6,903,324 B2
DATED : June 7, 2005
INVENTOR(S) : Hiroaki Tomofuji et al.

It is certified that error appears in the above-identified patent and that said Letters Patent is hereby corrected as shown below:

Column 21,
Line 17, change "therafter" to -- thereafter --.
Line 21, change "systems" to -- system --.

Signed and Sealed this

Fourteenth Day of February, 2006

JON W. DUDAS
*Director of the United States Patent and Trademark Office*